United States Patent
Kakarla et al.

(10) Patent No.: US 10,229,161 B2
(45) Date of Patent: Mar. 12, 2019

(54) AUTOMATIC CACHING OF SCAN AND RANDOM ACCESS DATA IN COMPUTING SYSTEMS

(71) Applicant: Oracle International Corporation, Redwood Shores, CA (US)

(72) Inventors: Sarat B. Kakarla, Sunnyvale, CA (US); Jia Shi, Burlingame, CA (US); Selcuk Aya, Muratapasa (TR); Kothanda Umamageswaran, Sunnyvale, CA (US); Juan R. Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 756 days.

(21) Appl. No.: 14/489,221

(22) Filed: Sep. 17, 2014

(65) Prior Publication Data

US 2015/0088805 A1 Mar. 26, 2015

Related U.S. Application Data

(60) Provisional application No. 61/880,483, filed on Sep. 20, 2013.

(51) Int. Cl.
*G06F 17/30* (2006.01)

(52) U.S. Cl.
CPC .... *G06F 17/3048* (2013.01); *G06F 17/30306* (2013.01); *G06F 17/30592* (2013.01)

(58) Field of Classification Search
CPC ........... G06F 17/3048; G06F 17/30306; G06F 17/30592
See application file for complete search history.

(56) References Cited

U.S. PATENT DOCUMENTS

| 4,425,615 A | 1/1984 | Swenson et al. |
| 4,463,424 A | 7/1984 | Mattson et al. |

(Continued)

FOREIGN PATENT DOCUMENTS

| CN | 101150483 A | 3/2008 |
| GB | 2409 301 A | 6/2005 |

(Continued)

OTHER PUBLICATIONS

IBM TDB, "A Scheduling Algorithm for Processing Mutually Exclusive Workloads in a multi-system Configuration", ip.com dated Aug. 19, 2002 (3 pages).

(Continued)

*Primary Examiner* — Scott A. Waldron
*Assistant Examiner* — Andalib F Lodhi
(74) *Attorney, Agent, or Firm* — Hickman Palermo Becker Bingham LLP

(57) ABSTRACT

Approaches, techniques, and mechanisms are disclosed for improved caching in database systems that deal with multiple data access patterns, such as in database systems that interface with both OLTP and Data Warehouse clients. A cache is deployed between a database server and a storage system that stores data units. Some of the data units accessed by the database server are buffered within the cache. The data units may be associated with data access patterns, such as a random data access pattern or a scan data access pattern, in accordance with which the database server is or appears to be accessing the data units. A processor selects when to cache data units accessed by the database server, based at least on the associated data access patterns. Recent access counts may also be stored for the data units, and may further be utilized to select when to cache data units.

26 Claims, 6 Drawing Sheets

(56) References Cited

U.S. PATENT DOCUMENTS

| | | | |
|---|---|---|---|
| 5,394,531 A | 2/1995 | Smith | |
| 5,717,893 A | 2/1998 | Mattson | |
| 5,765,034 A | 6/1998 | Recio | |
| 6,044,367 A | 3/2000 | Wolff | |
| 6,434,544 B1 * | 8/2002 | Bakalash | G06F 17/30489 |
| 6,457,105 B1 | 9/2002 | Spencer et al. | |
| 6,526,483 B1 | 2/2003 | Cho et al. | |
| 6,728,823 B1 | 4/2004 | Walker et al. | |
| 6,886,084 B2 | 4/2005 | Kawashima et al. | |
| 6,922,754 B2 | 7/2005 | Liu et al. | |
| 6,928,451 B2 | 8/2005 | Mogi et al. | |
| 7,036,147 B1 * | 4/2006 | Hursey | G06F 11/08 726/24 |
| 7,069,324 B1 | 6/2006 | Tiwana et al. | |
| 7,093,162 B2 | 8/2006 | Barga et al. | |
| 7,159,076 B2 | 1/2007 | Madter | |
| 7,165,144 B2 | 1/2007 | Choubal et al. | |
| 7,228,354 B2 | 6/2007 | Chambliss et al. | |
| 7,237,027 B1 | 6/2007 | Raccah et al. | |
| 7,290,090 B2 | 10/2007 | Madter | |
| 7,461,147 B1 | 12/2008 | Mowat et al. | |
| 7,506,103 B2 | 3/2009 | Madter | |
| 7,636,814 B1 | 12/2009 | Karr et al. | |
| 7,660,945 B1 | 2/2010 | Lee | |
| 7,769,802 B2 | 8/2010 | Smith | |
| 7,836,262 B2 | 11/2010 | Gunna | |
| 7,904,562 B2 | 3/2011 | Takase et al. | |
| 8,145,806 B2 | 3/2012 | Lee et al. | |
| 8,244,984 B1 | 8/2012 | Glasco et al. | |
| 8,326,839 B2 | 12/2012 | Idicula et al. | |
| 8,327,080 B1 | 12/2012 | Der | |
| 8,359,429 B1 | 1/2013 | Sharma et al. | |
| 8,370,452 B2 | 2/2013 | Harvell et al. | |
| 8,521,923 B2 | 8/2013 | Lee et al. | |
| 8,683,139 B2 | 3/2014 | Gaither | |
| 8,868,707 B2 | 10/2014 | Menta et al. | |
| 8,868,831 B2 | 10/2014 | Badrinarian | |
| 8,874,807 B2 | 10/2014 | Lee et al. | |
| 9,003,159 B2 | 4/2015 | Deshkar | |
| 9,256,542 B1 | 2/2016 | Flower | |
| 9,361,232 B2 | 6/2016 | Umamageswarm et al. | |
| 9,405,694 B2 | 8/2016 | Goyal et al. | |
| 2002/0143755 A1 | 10/2002 | Wynblatt et al. | |
| 2003/0115324 A1 | 6/2003 | Blumeanau et al. | |
| 2004/0003087 A1 | 1/2004 | Chambliss et al. | |
| 2004/0054860 A1 | 3/2004 | Dixit | |
| 2004/0062106 A1 | 4/2004 | Ramesh et al. | |
| 2004/0117441 A1 | 6/2004 | Liu et al. | |
| 2004/0148486 A1 | 7/2004 | Burton | |
| 2004/0215626 A1 | 10/2004 | Colossi et al. | |
| 2004/0225845 A1 | 11/2004 | Kruckemyer et al. | |
| 2004/0230753 A1 | 11/2004 | Amiri | |
| 2004/0254943 A1 | 12/2004 | Malcolm | |
| 2005/0056520 A1 | 4/2005 | Dharmapurikar et al. | |
| 2005/0120025 A1 | 6/2005 | Rodriguez et al. | |
| 2005/0160224 A1 | 7/2005 | Cuomo et al. | |
| 2005/0193160 A1 | 9/2005 | Bhatt et al. | |
| 2005/0210202 A1 | 9/2005 | Choubal et al. | |
| 2005/0283637 A1 | 12/2005 | Coldicott et al. | |
| 2006/0106890 A1 | 5/2006 | Paul et al. | |
| 2006/0209444 A1 | 9/2006 | Song | |
| 2006/0218123 A1 | 9/2006 | Chowdhuri et al. | |
| 2006/0224451 A1 | 10/2006 | Kerschbrock et al. | |
| 2006/0224551 A1 | 10/2006 | Lariba-Pey | |
| 2006/0271605 A1 | 11/2006 | Petruzzo | |
| 2006/0271740 A1 | 11/2006 | Mark | |
| 2006/0277439 A1 | 12/2006 | Davia et al. | |
| 2007/0067575 A1 | 3/2007 | Morris et al. | |
| 2007/0124415 A1 | 5/2007 | Lev-Ran et al. | |
| 2007/0220348 A1 | 9/2007 | Mendoza et al. | |
| 2007/0260819 A1 | 11/2007 | Gao et al. | |
| 2007/0271570 A1 | 11/2007 | Brown et al. | |
| 2008/0016283 A1 | 1/2008 | Madter | |
| 2008/0046736 A1 | 2/2008 | Arimilli et al. | |
| 2008/0104283 A1 | 5/2008 | Shin et al. | |
| 2008/0104329 A1 | 5/2008 | Gaither et al. | |
| 2008/0147599 A1 | 6/2008 | Young-Lai | |
| 2008/0155229 A1 | 6/2008 | Beyer et al. | |
| 2008/0177803 A1 | 7/2008 | Fineberg et al. | |
| 2008/0244184 A1 | 10/2008 | Lewis et al. | |
| 2008/0244209 A1 | 10/2008 | Seelam et al. | |
| 2008/0307266 A1 | 12/2008 | Chandrasekaran | |
| 2009/0164536 A1 | 6/2009 | Nasre et al. | |
| 2009/0182960 A1 | 7/2009 | Crockett | |
| 2009/0193189 A1 | 7/2009 | Carswell et al. | |
| 2009/0210445 A1 * | 8/2009 | Draese | G06F 17/30315 |
| 2009/0248871 A1 | 10/2009 | Takase et al. | |
| 2010/0017556 A1 | 1/2010 | Chin et al. | |
| 2010/0077107 A1 | 3/2010 | Potapov et al. | |
| 2010/0082648 A1 | 4/2010 | Potapov et al. | |
| 2010/0158486 A1 | 6/2010 | Moon | |
| 2010/0274962 A1 | 6/2010 | Moesk | |
| 2010/0199042 A1 | 8/2010 | Bates | |
| 2010/0205367 A1 | 8/2010 | Ehrlich | |
| 2010/0332901 A1 | 12/2010 | Nussbaum et al. | |
| 2011/0022801 A1 | 1/2011 | Flynn | |
| 2011/0040861 A1 | 2/2011 | Van der Merwe | |
| 2011/0047084 A1 | 2/2011 | Manzalini et al. | |
| 2011/0066791 A1 | 3/2011 | Goyal | |
| 2011/0153719 A1 | 6/2011 | Santoro | |
| 2011/0173325 A1 | 7/2011 | Cherian et al. | |
| 2011/0191543 A1 | 8/2011 | Craske et al. | |
| 2011/0238899 A1 | 9/2011 | Yano | |
| 2011/0320804 A1 | 12/2011 | Chan et al. | |
| 2012/0124296 A1 | 5/2012 | Bryant | |
| 2012/0144234 A1 | 6/2012 | Clark et al. | |
| 2012/0159480 A1 | 6/2012 | Matsuzawa | |
| 2013/0086330 A1 | 4/2013 | Baddepudi et al. | |
| 2013/0159627 A1 * | 6/2013 | Shea | G06F 12/0897 711/122 |
| 2013/0275402 A1 | 10/2013 | Zhou et al. | |
| 2013/0326152 A1 | 12/2013 | Loaiza et al. | |
| 2014/0089565 A1 | 3/2014 | Lee | |
| 2014/0149638 A1 | 5/2014 | Jain | |
| 2014/0281167 A1 | 9/2014 | Danilak | |
| 2014/0281212 A1 * | 9/2014 | Schreter | G06F 3/0674 711/112 |
| 2014/0281272 A1 | 9/2014 | Loaiza et al. | |
| 2014/0337314 A1 | 11/2014 | Potapov et al. | |
| 2014/0359050 A1 * | 12/2014 | Butt | G06F 15/17331 709/214 |
| 2014/0359222 A1 * | 12/2014 | Zachariassen | G06F 12/0815 711/124 |
| 2015/0006813 A1 | 1/2015 | Goyal et al. | |
| 2015/0012690 A1 | 1/2015 | Bruce | |
| 2015/0089121 A1 | 3/2015 | Coudhury et al. | |
| 2016/0117125 A1 | 4/2016 | Starr | |
| 2017/0357588 A1 | 12/2017 | Moyer | |
| 2018/0129612 A1 | 5/2018 | Lewis | |

FOREIGN PATENT DOCUMENTS

| | | |
|---|---|---|
| JP | 2002-278704 A | 9/2002 |
| JP | 2003-150419 A | 5/2003 |
| JP | 2004-038758 A | 2/2004 |
| WO | WO 93/18461 | 9/1993 |

OTHER PUBLICATIONS

O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

Zhe, Li, et al., "PERF join: an alternative to two-way semijoin and Bloomjoin" Proceedings of the 1995 ACM CIKM International Conference on Information and Knowledge Management ACM New York. NY, US., 1995, pp. 187-144, ISBN: 0-89791-812-6.

Loizos, M., et al., "Improving distributed join efficiency with extended bloom filter operations", Advanced Networking and Appli-

(56) References Cited

OTHER PUBLICATIONS cations, 2007. AINA '07., 21$^{st}$ International Conference on IEEE, PI, May 1, 2007, pp. 187-194, ISBN: 978-0-7695-2846-5.
Lewis, U.S. Appl. No. 15/687,296, filed Aug. 25, 2017, Office Action, dated Jul. 26, 2018.

* cited by examiner

AUTOMATIC CACHING OF SCAN AND RANDOM ACCESS DATA IN COMPUTING SYSTEMS

CROSS-REFERENCE TO RELATED APPLICATIONS; BENEFIT CLAIM

This application claims the benefit of U.S. Provisional Application No. 61/880,483, filed Sep. 20, 2013, the entire contents of which is hereby incorporated by reference as if fully set forth herein, under 35 U.S.C. § 119(e).

TECHNICAL FIELD

Embodiments relate generally to data management, and, more specifically, to caching of data from data warehouses and/or other complex information systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different types of data operations may exhibit different data access patterns. For instance, some types of database operations may be classified as involving either Online Transaction Processing ("OLTP") or Data Warehousing. A typical OLTP operation accesses only a handful of records. For example, an OLTP operation may be to "retrieve the current order for this customer." By contrast, a typical Data Warehousing operation involves analyzing thousands or millions of rows. For example, a Data Warehousing operation may be "Find the total sales for all customers last month." Database systems typically employ different techniques to efficiently perform these different types of operations. For example, for OLTP operations, the database system builds indexes of certain table columns. The exact rows needed for an OLTP operation may be located by scanning the index, and only minimal data blocks are retrieved in a seemingly random access pattern. For Data Warehousing operations, on the other hand, a more comprehensive scan of a table is needed. Thus, large ranges of data blocks are retrieved in a more sequential access pattern.

An example scan operation is a table scan. A table scan is an operation performed on a database in which each row of a table is read, and the columns encountered are checked for the validity of a condition. A table scan may be performed in a variety of circumstances, such as when a column of a table that is involved in a database operation does not contain an index that can be used for checking the validity of a condition. Table scans are often sequential, in that the rows may be read in a sequential (serial) order. A table scan often requires a relatively heavy amount of input/output ("I/O") read and/or write operations at the data storage system upon which the underlying data for the table is stored, thus resulting in multiple seek operations as well as costly disk-to-memory transfers. Many other scan operations also exist. For explanatory purposes, this application may at times describe techniques in terms of "table scan operations" or "table scans." However, unless otherwise noted, the techniques are also more generally applicable to any type of scan operation.

Caching scanned data can be a big challenge due to the size of scanned data sets. Conventional database caching algorithms are designed to cache frequently accessed random data blocks, and this approach is often sufficient for OLTP data. However, scanned data sets are often very large relative to OLTP data. After a scan operation is performed on a data set, the entire data set may not be referred to again for quite some time, if at all, and/or another set of data might need to be scanned. If multiple scans of data are occurring concurrently, the scans may end up replacing each other's data.

In database environments that involve both OLTP data and Data Warehousing data, the caching of scanned data presents further obstacles. Moreover, scanned data may quickly push OLTP data out of a cache, even though the OLTP data is often more useful to cache. It is thus a challenge to cache both kinds of data at the same time. Database administrator therefore typically fine tune the caching policy of their database systems to either an OLTP data access pattern, or Data Warehouse data access pattern. In some instances, an administrator may explicitly mark which data units to cache and/or which data units not to cache.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
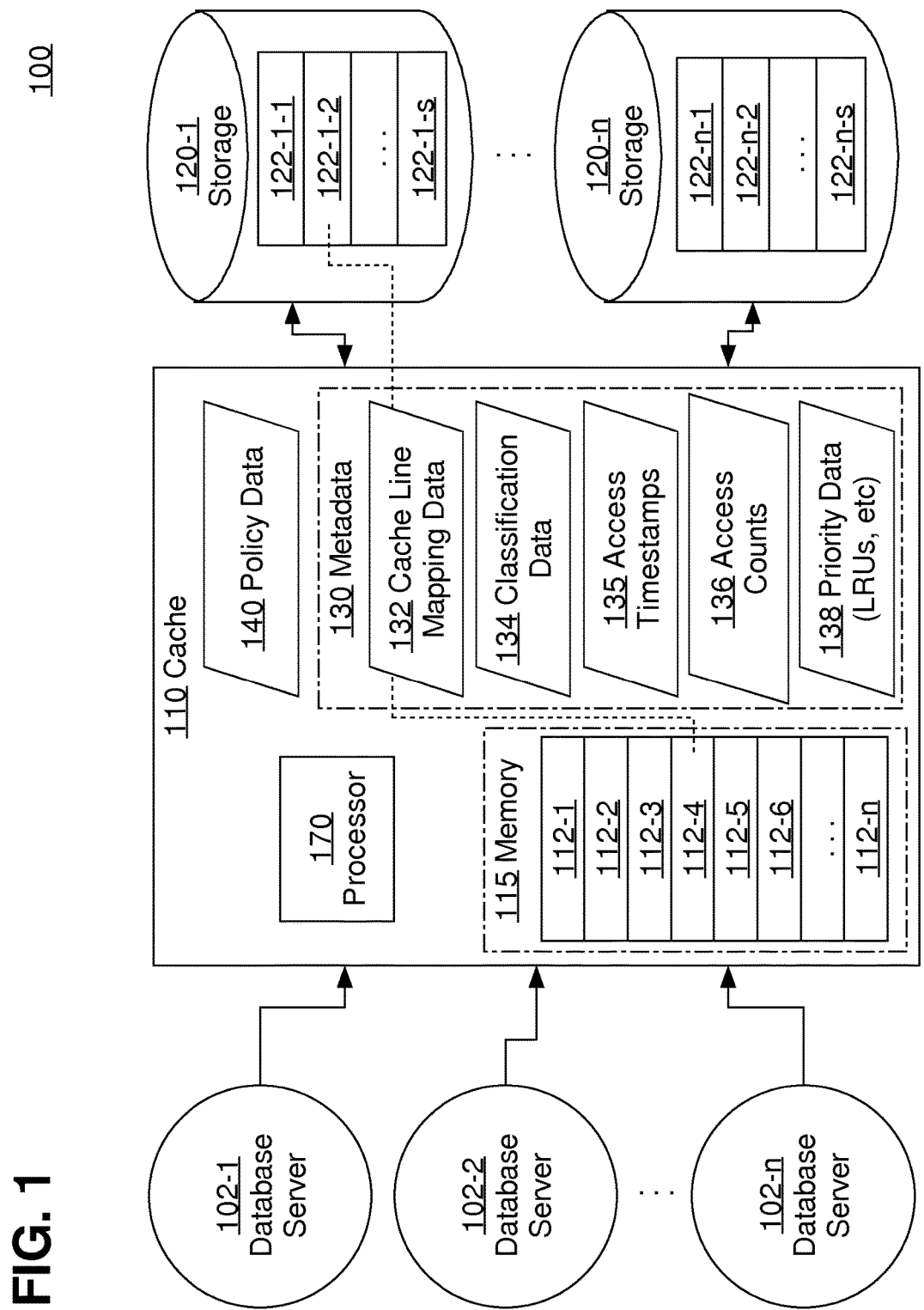
FIG. 1 illustrates an example database management system comprising a caching system in which the describe techniques may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   2.0. Structural Overview
   2.1. Database Storage Cache
   2.2. Database Servers
   2.3. Data Containers
   2.4. Storage Systems
   2.5. Enhanced Storage System
   2.6. Caching in Multi-Pattern Database Systems
   2.7. Example System Architecture
   2.8. Cache Structure 3.0. Functional Overview
3.1. Caching Process Flow
3.2. Differentiating Between Scanned Data and OLTP Data
3.3. Example Process Flow for a Scanned Data Policy
3.4. Weighting the Access Counts
3.5. Example Scanned Data Caching Policies
4.0. Example Implementation Details
4.1. LRU Lists
4.2. Tracking the scan block's usage statistics
4.3. Reserving the cache for OLTP buffers
4.4. Access counts
4.5. Cooling the access counts:
4.6. Replenishing
4.7. Finding Free Cache Lines
4.8. Handling Scanned Data that is Already Partially Cached
4.9. Administrative Considerations
4.10. Miscellaneous
5.0. Example Embodiments
6.0. Hardware Overview
7.0. Extensions and Alternatives 1.0. General Overview Approaches, techniques, and mechanisms are disclosed for improved caching in database systems that deal with multiple data access patterns, such as in database systems that interface with both OLTP and Data Warehouse clients. According to an embodiment, a cache is deployed between a database server and a storage system that stores data units. Some of the data units accessed by the database server are buffered within the cache. The data units may be associated with data access patterns, such as a random data access pattern or a scan data access pattern, in accordance with which the database server is or appears to be accessing the data units. A caching system selects when to cache data units accessed by the database server, based on the associated data access patterns. Last access timestamps may be stored for the data units. Various types of recent access counts may also be stored for the data units, reflecting how frequently the data units have been accessed over a recent period of time. The recent access counts and last access timestamps may be utilized to select when to cache data units. A variety of other cache metadata may also or instead be utilized for this purpose.

According to an embodiment, a database server sends requests to access data units stored in one or more storage systems. A caching system intercepts the requests and attempts to respond with cached data, if possible. For certain data units that are not cached, the caching system accesses the certain data units within one or more storage systems. The caching system identifies which of the data access patterns to associate with these certain data units. The caching system applies a first caching policy to determine whether to cache first data units, of the certain data units, responsive to the first data units being associated with the random data access pattern. The caching system applies a second and different caching policy to determine whether to cache second data units, of the certain data units, responsive to the second data units being associated with the scan data access pattern. For data units that are determined to be cacheable based on applying the first policy or the second policy, the caching system stores the cacheable data units in the cache responsive to the requests from the database server.

According to an embodiment, whenever a given data unit of the certain data units is associated with a random data access pattern, a caching system determines to automatically store the given data unit in the cache, without further filtering. Whenever a given data unit of the certain data units is associated with the scan data access pattern, the caching system determines to cache the given data unit only if a set of conditions is true. The set of conditions may include, for example, caching the given data unit only when a number of cache lines in the cache are determined to be eligible to store the given data unit, based at least on which of the data access patterns are associated with existing data already stored in the cache lines and on recent access counts associated with the existing data. The number selected should in combination be of sufficient size to store the given data unit. The set of conditions may also or instead include, for example, caching the given data unit only when a recent access count associated with the given data unit exceeds a threshold count. The set of conditions may also or instead include, for example, caching the given data unit only when doing so will not result in the cache being comprised of more than a threshold percentage of data associated with the scan data access pattern, and/or of less than a threshold percentage of data associated with the random data access pattern. A variety of other alternative or additional conditions are also possible.

In an embodiment, upon determining to cache a given data unit, a location in which to store a given data unit in the cache may further be identified based at least in part on which of the data access patterns is associated with the given data unit. The cache may store data in block or unit structures, often of fixed size, which are referred to herein as "cache lines." Hence, identifying the location may involve identifying the cache line or lines that will be used to store the data unit. For instance, whenever a given data unit of the certain data units is associated with a scan data access pattern, the one or more cache lines in which to store the given data unit may be selected based at least on which of the data access patterns are associated with existing data in the cache lines and on recent access counts for the existing data. Meanwhile, whenever a given data unit of the certain data units is associated with a random data access pattern, the given data unit may be stored in a cache line without regard to which of the data access patterns is associated with existing data in the cache line.

In an embodiment, the process of determining whether to cache a given data unit that is associated with a scan data access pattern comprises comparing the recent access count of the given data unit to one or more recent access counts for a set of cached data units already stored in the cache, and comparing a last access time of the given data unit to one or more last access times for the set of cached data units already stored in the cache.

In an embodiment, the process of determining whether to cache a given data unit that is associated with a scan data access pattern comprises searching for the eligible cache lines only in a set of cache lines designated to be freeable. For instance, a least recently used ("LRU") or similar data structure may be maintained indicating which cache lines are freeable. In an embodiment, when existing data already stored in the cache line is associated with the scan data access pattern, the cache line is determined to be eligible based upon comparing a recent access count of the existing data to a recent access count of the given data unit. When the existing data already stored in the cache line is associated with the random data access pattern, the cache line is determined to be eligible based upon comparing a recent access count of the existing data to a weighted recent access count of the given data unit.

In an embodiment, the recent access counts may be weighed differently depending on with which of the data access patterns the corresponding data units are associated. For instance, the recent access counts may be weighted to take into account a cost/benefit ratio that quantifies a cost of replacing data associated with one access pattern with a benefit of replacing data associated with another access pattern. The cost and benefits may be, for instance, based in part on the sizes of cache lines, I/O operations, and/or of typical data units that conform to the respective data access patterns.

In an embodiment, the recent access counts are skewed to emphasize more recent accesses of the data units more heavily than less recent accesses. For instance, the recent access counts may be decreased over time and/or responsive to an amount of bytes being accessed in the cache.

In an embodiment, the process of associating a given data unit with a data access pattern is based on one or more of: an access pattern indicator in metadata associated with the request in which the given data unit is involved, a characteristic of the request, or a characteristic of the given data unit.

In other aspects, the invention encompasses a computer apparatus and a computer-readable medium configured to carry out the foregoing.

2.0. Structural Overview

FIG. 1 illustrates an example database management system 100 comprising a caching system 110 in which the described techniques may be practiced, according to an embodiment. System 100 comprises one or more computing devices. These one or more computing devices comprise any combination of hardware and software configured to implement the various logical components described herein, including components 102-170. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Database Storage Cache

Caching system 110 is logically deployed between one or more database server components 102, depicted as database servers 102-1 . . . 102-n, and one or more data storage components 120, depicted as storage components 120-1 . . . 120-n. Database server components 102 provide the database server functionality described in subsequent sections. Data storage components 120 provide read and write access to data stored on behalf of the database servers 102, as also described in other sections. Caching system 110, among other aspects, relays data between the database server components 102 and the data storage components 120.

The deployment of caching system 110 between the database server components 102 and storage components 120 is said to be "logical" in that caching system 110 need not necessarily be physically situated between hardware at which a database server component 102 is implemented and hardware at which a storage component 120 is implemented. Rather, system 100 is configured such that some or all requests by database server components 102 to access data stored in storage components 120 are routed through caching system 110. In some embodiments, caching system 110 may be implemented by separate physical hardware than database server 102 or storage components 120, and configured to communicate with those components by various networked communication links. In other embodiments, caching system 110 may in fact be located at the same hardware as storage components 120 (e.g. in a data storage computing system such as an Exadata cell), or even at the same hardware as a database server 102.

Selective Caching

As data is transmitted between database servers 102 and storage components 120, caching system 110 is configured to cache some of the data in one or more memories 115. When a new request to access data is received, a processor 170 of caching system 110 may attempt to locate the requested data in cache lines 112, depicted as cache lines 112-1 . . . 112-n, of the one or more memories 115, collectively referred to as a cache. Each cache line 112 may include at least a portion of one or more data units 122, depicted as data units 122-1-1 . . . 122-n-s, which are permanently stored in storage component 120. The processor may consult cache line mapping data 132, which associates cache lines 112 with the data units 122 they cache, in order to determine if a requested unit 122 is cached. If so, the caching system 110 may provide access (e.g. return or write) to a cached version of the accessed unit in the appropriate cache line 112. Otherwise, caching system 100 relays the request to the appropriate storage component(s) 120, and relays any responsive data back to the appropriate data server 102. Caching system 110 further employs suitable cache coherency technique(s) to maintain the integrity of the underlying data units 122.

One or more processors 170 in caching system 110 are configured to select which data to cache in memory 115 using one or more policies described by policy data 140. Policy data 140 may represent the policies using any combination of logic and/or data structures, including without limitation hard-coded executable instructions, user-configurable executable instructions, stored parameters, table rows, and so forth. The policies may indicate whether to cache certain data and/or where to store the data (e.g. when to replace old data already in the cache with new data). The policies may be based on various characteristics of both the data being accessed and/or of the data already in the one or more memories 115. The characteristics may be found within the actual data, and/or stored in cache metadata 130.

In embodiments, different policies may be used in different contexts, such as under different data access patterns. These policies may or may not have distinct representations within policy data 140. For instance, in one embodiment, a first policy is described by a distinct first policy data structure and/or logic, while a second policy is described by a distinct second policy data structure and/or logic. In another embodiment, policy data 140 may describe rules and/or logic that branch to different steps or elements depending on the context (e.g. the data access pattern). The policy data 140 may label or otherwise treat these rules and/or logic as a single policy. However, for the purposes described herein, the branches, at least with respect to the data access patterns, are considered to form separate and distinct policies.

Cache Metadata

Cache metadata 130 is a collection of data associated with each cache line 112 and, in some cases, each data unit 122.

Cache metadata 130 may be stored in any combination of cache headers or auxiliary structures within memory 115 and/or any other suitable location.

For instance, in an embodiment, cache metadata 130 comprises classification data 134, which is consulted to determine which of the policies to apply. In an embodiment, the classification data 134 at least indicates whether (or to what extent) a given unit of data is considered to be "scanned data," and thus associated with a scan data access pattern, or "OLTP data," and thus associated with a random data access pattern. The processor 170 may then apply different policies when determining whether to cache the given unit of data, based on which classification of data is indicated. In an embodiment, the classification data 134 may actually specify the classification of a given unit of data. For instance the classification data 134 may be a binary bit within the cache header of a cache line, indicating whether the data cached therein is considered to be scan data or OLTP data. In an embodiment, the classification data 134 may instead include various pieces of data from which the classification may be determined, as described in other sections. For instance, in an embodiment, the classification data 134 may include an association between a transaction identifier for an operation in which the data was last accessed, as well an association between the transaction identifier and different data units. In an embodiment, classification data 134 may be an intrinsic aspect of a cached data unit 122, and thus not have a separate manifestation in cache metadata 130.

As further examples of cache metadata 130, cache metadata 130 may include access timestamps 135, indicating when a given data unit was last accessed, and access counts 136, which are scores that reflect, at least relatively, how often a given data unit has been accessed over a recent period of time. Some or all of the described policies may be based on these and/or other data. For instance, one policy may indicate to only place an item in the cache if it has an access count above a certain threshold and an access timestamp more recent than a certain time. Processor 170 may be configured to update these and other types of cache metadata 130 whenever data is accessed through the caching system 110, whether or not the data is actually cached, as well as in response to other potential triggers, such as a passage of a certain amount of time. Thus, some cache metadata 130 may exist for data units that are not currently in memory 115 as well as those that are.

In an embodiment, some access count 136 may be weighted based on associated classification data 134. Thus, for instance, while each access of a certain type of data unit might increase an associated access count 136 by one point, each access of another type of data unit might increase an associated access count 136 by only one fifth point. In an embodiment, there may be different access counts 136 for different purposes. For instance, there may be a scan access count that is updated each time a data block is involved in a scan operation, and separately a normal access count that is updated each time a data block is accessed in any type of operation. In an embodiment, a scan access count is kept for all data units in a storage system whereas other types of access counts are stored only for data units in the cache, and are thus reset every time the data units enter the cache.

In an embodiment, access counts 136 are skewed to count recent accesses of the data units more heavily than less recent accesses. In an embodiment, this may be accomplished using any of a variety of suitable cooling processes, including without limitation the example cooling processes described herein. For instance, in one such process, some or all of access counts 136 may be "cooled" at intervals by decrementing the access counts by a certain amount, to indicate that the associated data has been accessed less recently than other data. Again, the cooling processes may be relative to the classifications in classification data 134, such that access counts 136 associated with data corresponding to one type of data access pattern are cooled less frequently or by smaller amounts than other access counts 136. In an embodiment, access counts 136 are not actually stored, but rather calculated based on access logs, and the calculation mechanism may thus skew access counts 136 to more heavily emphasize more recent accesses.

Metadata 130 optionally includes priority data 138, which prioritizes cache lines 112 according to various needs. For instance, the priority data 138 may be utilized to allow caching system 110 to quickly identify one or more cache lines 112 that have a lowest priority and thus would be suitable for replacement (e.g. cache lines that are deemed to be "freeable"). Priority data 138 may indicate, for instance, a set of one or more least recently used units (the "LRU") cached in memory 115. A variety of prioritization techniques exist for identifying lower (or at least a lowest) priority cache lines 112. The priority data 138 may take any suitable form, including without limitation, a linked list or sorted array of cache line mappings, a table of prioritization scores, and so forth. Processor 170 may update this priority data 138 periodically and/or in response to triggering conditions, such as a certain number of bytes having been accessed in the cache or a certain number of requests having been received from a database server 102. In other embodiments, no permanent priority data exists, and instead a lowest priority unit may be identified on demand using any suitable prioritization algorithm.

For purposes of explanation, this disclosure may, at times, describe certain techniques specifically with respect to an LRU. Unless otherwise noted, however, the techniques may instead be performed with any data unit(s) that have been assigned a lowest priority using any suitable prioritization mechanism.

The depicted system 100 is one example of a system that is suitable for performing the techniques described herein. Other systems may include additional or fewer components in varying arrangements. For instance, other systems 100 may include any number of database servers 102, storage components 120, and/or caching systems 100. As another example, in addition to caching system 110, there may be other components through which data is also passed in route from data storage components 120 to database server 102, including routers and potentially other types of caches. Moreover, a variety of other cache metadata 130 may be kept. The quantity of data units 122 stored in storage components 120 and cache lines 112 in memory 115 will typically be significantly greater than depicted. Depending on the embodiment, the division of described functions between components may also vary.

Various aspects of certain components of system 100 and/or other systems for implementing the described techniques are described below.

2.2. Database Servers

A database management system ("DBMS") manages a database. A database management system may comprise one or more database servers. A database comprises database data and metadata that is stored on a persistent memory mechanism, such as a set of hard disks. Metadata defines database objects, such as relational tables, table columns, views, and triggers.

Database applications and clients interact with a database server by submitting to the database server commands that cause the database server to perform operations on data stored in a database. A database command may be in the form of a database statement that conforms to a database language. One of the languages for expressing database requests is the Structured Query Language (SQL). There are many different versions of SQL; some versions are standard, others are proprietary. There is also a variety of extensions to SQL. SQL data definition language (DDL) instructions may be issued to a database server to create or configure database objects, such as tables, views, or complex data types. SQL/XML is a common extension of SQL used when manipulating XML data in an object-relational database.

2.3. Data Containers

Generally, data is logically structured within a database in one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the presented approach are not limited to any particular type of data container or type of database architecture. However, for the purpose of explanation, the examples and the terminology used herein are usually associated with relational or object-relational databases. Thus, the terms "table," "row," and "column" are used herein to refer respectively to the data container, record, and field.

Data containers are typically stored on a hard disk in one or more data blocks. Hence, while instructions or queries issued to a database server refer to data as tables, rows, and columns, that data is actually stored in a database as a collection of data blocks. Through the use of various stored metadata, indexes, and headers, the database server is able to interpret the data within the data blocks as logical tables, rows, and columns.

A data block is an atomic unit of storage space allocated to store raw data for one or more database records (e.g., rows) or portions thereof. Typically, a database system is configured to read and write database records from persistent cache and volatile memory in units no smaller than data blocks. When a record, from a data block, needs to be retrieved, an entire data block containing the record (or pertinent portion of the record) is read into a buffer that the database system uses to temporarily store data blocks. The data block read into the buffer may contain other records or portions thereof.

There are several formats for storing data in a database. Two basic formats include a row-major format and column-major format. In row-major format, column values of a single row are stored contiguously within a data block. In column-major format, values of a column of multiple rows are stored contiguously. In column-major format, a data block may only contain the values for one column. The row-major format and column-major format are collectively referred to herein as major formats.

2.4. Storage Systems

Database servers maintain the underlying data for a database in one or more persistent storage systems. These storage systems typically provide the database servers with large capacities of persistent, non-volatile storage in which the database servers may store the underlying data, often in the form of one or more storage devices such as hard disks. One example of such a storage system is a storage array.

Some storage systems are optimized with software or hardware logic for performing low-level, specialized data management functions, such as storage device backup, storage device optimization, striping across multiple individual storage devices, shared data access, block caching, and so on. In an embodiment, a database server may rely on storage systems to provide low-level functions, so that the database server can utilize its resources for other tasks, such as query compilation and execution, data analysis, and communication with clients.

In many embodiments, the storage systems utilized by database servers constitute little more than one or more simple, linearly addressed, blocked, and persistent storage devices. As such, the storage systems may be oblivious to the logical structures represented by the underlying data they store. Furthermore, interaction between database servers and storage systems may be limited to simple input/output (I/O) requests to read or write ranges of bytes from or to disk.

Thus, while database servers present database data to clients as logical structures such as described above, the underlying data for a database may be stored in different, simpler structures at the storage system. For example, in order for a database server to store data at a conventional hard disk, the database server structures that data to conform to a block structure supported by the hard disk. So, while most clients issue instructions or queries to a database server that refer to data via reference to logical structures such as tables and columns, the database server actually retrieves that data from a storage system in raw blocks. Through the use of various stored metadata, indexes, and headers, the database server is able to interpret the data within the structures retrieved from the storage system as logical tables, rows, and columns. For convenience, structures in which a database's "raw" or underlying data is stored at a storage system shall hereinafter be referred to as data blocks or data units. Techniques described in terms of data blocks or data units should be understood as being equally applicable to other structures for storing raw data at a storage system.

For example, when a database server executes a command that requires access to a logical structure in a database, the database server may utilize mapping data to identify a data block or range of data blocks at a storage system in which the underlying data for that logical structure is stored. The database server may then send a read request to the storage system for the mapped data block(s). In response to the request, the storage system may read the identified data block(s) from storage and send those data block(s) to the database server. The database server may then interpret the data block(s) as logical rows and columns of a table. The database server executes the command based on its interpretation of the data block(s) as logical rows and columns.

2.5. Enhanced Storage System

An enhanced storage system is a storage system configured to work cooperatively with a database server, and to provide filtered and unfiltered data blocks to the database server. An enhanced storage system may perform some filtering of the data in the data blocks based on filtering criteria provided by the database server. The enhanced storage system may be equipped with modules configured to determine compression formats, evaluate costs associated with sending data to the storage server, perform selectivity of each predicate, and so forth. An example enhanced storage system is the Exadata storage machine.

In managing data storage, an enhanced storage system may utilize metadata stored in each data block, referred to herein as data block metadata. The data block metadata within a data block may, for example, indicate where each column within the data block begins. In addition, among other elements, the data block metadata may contain control information for database transactions, and a token table used for compressing the data block.

2.6. Caching in Multi-Pattern Database Systems

As explained in other sections, two common data usage patterns for database systems are OLTP and Data Warehousing. While many database systems are designed primarily for only one of these data usage patterns, multi-pattern systems are increasingly prevalent. Among other advantages, the described techniques may be useful for caching at any component of a database system that, as a result of multiple data usage patterns, may cache both OLTP data and scanned data.

As another example, a system may comprise a single database server for both OLTP and Data Warehousing applications. The techniques described herein may thus be applied to caching at the database server, data storage system, and/or at any intermediate component. As another example, different database servers within the same system may be dedicated to different data usage patterns, yet rely upon the same set of one or more data storage systems. Thus, the techniques described herein may be applied to caching at the data storage system.

For purposes of explanation, certain techniques described herein are described in terms of caching at the data storage system. However, unless otherwise stated, the techniques also apply to caching at other components of a database system.

2.7. Example System Architecture

Figure 2:
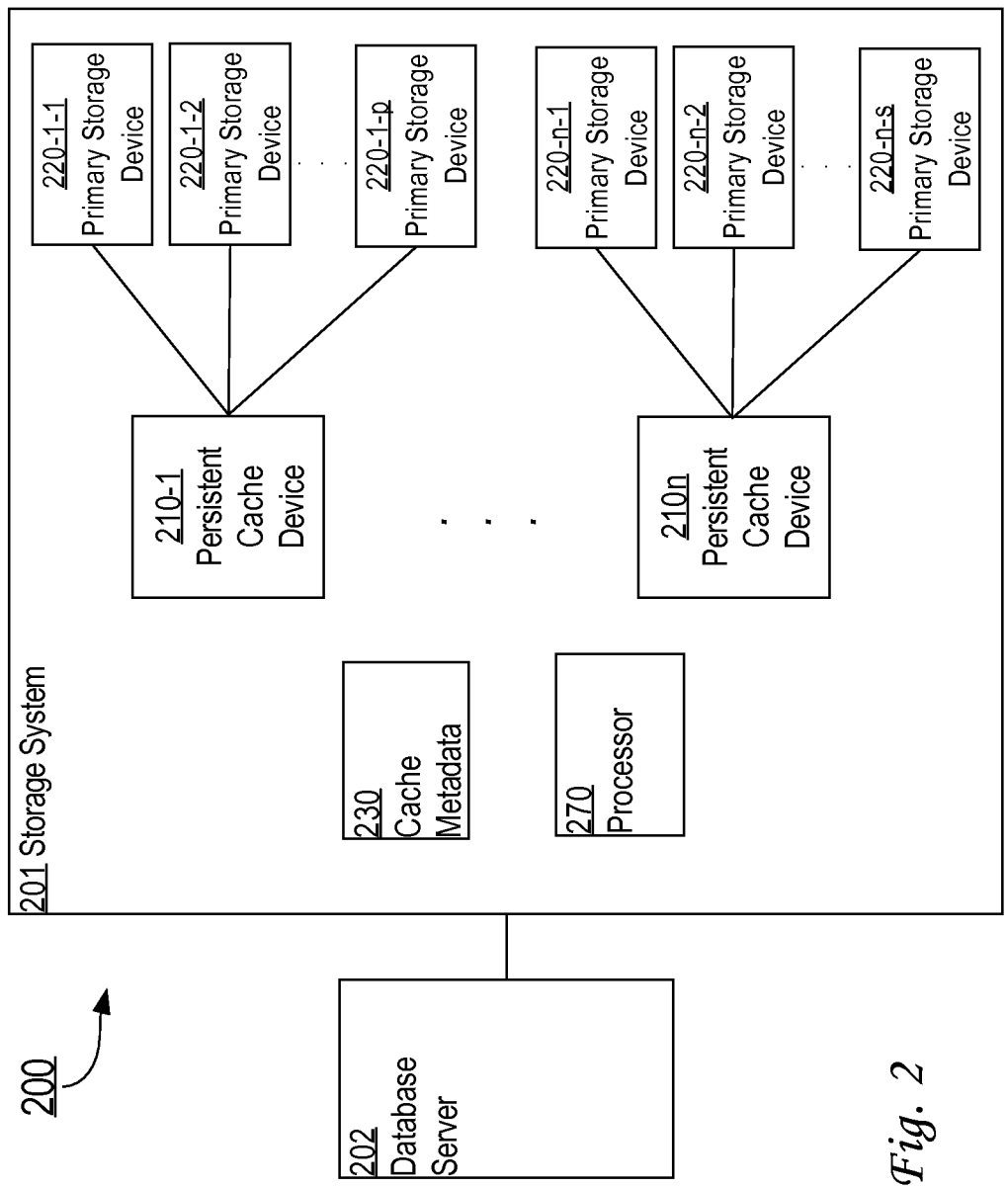
FIG. 2 is a block diagram that depicts another example system for implementing techniques described herein.

FIG. 2 is a block diagram that depicts another example system 200 for implementing techniques described herein, according to an embodiment. System 200 is an example of configuration of system 100, and comprises a storage system 201 and a database server 202. Database server 202, which is similar to database server component 102, comprises a set of one or more processes executing on one or more computing devices in order to provide logical access to one or more databases. Storage system 201 comprises a set of one or more processes executing one on or more computing devices in order to provide database server 202 with the underlying data, such as disk blocks, represented by the one or more databases. Storage system 201, in an embodiment, may include one or more of storage components 120.

Database server 202 may interact with client applications executing on client computing devices through any of a variety of means, including communications via network or local interfaces. The number and type of clients that concurrently interact with a database server varies depending on the system. The interactions between clients and database server 202 typically involve the communication of data in the form of logical structures such as databases and tables. Clients send database commands, such as SQL statements, to database server 202, each command referencing certain of these logical structures. In order to respond to many of these database statements, database server 202 requests from storage system 200 raw data that corresponds to the referenced logical structures, translates that raw data into the referenced logical structures, and performs any operations indicated by the database statements based on the translation. In many cases, database servers 202 will return logical structures known as result sets back to the clients based on the results of performing the operations with respect to the referenced logical structures.

Database server 202 may interact with storage system 201 through any of a variety of means. For example, one or more database servers 202 may be connected to one or more interfaces at an Infiniband switch, which in turn comprises one or more interfaces for connecting to one or more storage systems 201. Other embodiments may feature other means for connecting to storage system 201, including connections via any of a wide variety of communication links as well as direct connections between ports at database servers 202 and ports at storage system 201.

Communications between database server 202 and storage system 201 may take a variety of forms, including simple read/write requests using standard I/O protocols such as Serial ATA or iSCSI. For example, in response to determining that raw data located in a data unit at a certain address is necessary to perform an operation, database server 202 may construct a simple read/write request to storage system 201. In response, storage system 201 may respond with the requested data unit.

According to an embodiment of the invention, database servers 202 may also communicate enhanced I/O requests to storage system 201. These requests identify not only the location of data units that store raw data required by database server 202, but also various metadata describing operations that storage system 201 may perform to filter the raw data prior to returning it to database server 202. Such metadata may include, for instance, SQL predicates and metadata describing certain aspects of the logical structure of the raw data in the data units. Database server 202 may, in turn, receive filtered data units from storage system 201 responsive to the enhanced I/O requests. In an embodiment, the filtered data units received by data server 202 may even be reformatted in other structures, such as row-formatted data.

In some embodiments, enhanced requests and responses may be communicated via an enhanced I/O protocol. An example protocol suitable for such communications is Oracle's iDB protocol, which in turn is based on the reliable datagram socket protocol known as the Zero-loss Zero-copy Datagram Protocol (ZDP).

Storage system 201 is an enhanced storage system. In an embodiment, storage system 200 is a self-contained computing device, physically distinct from the one or more computing devices at which database server 202 are implemented. For instance, storage system 201 may be an Exadata cell. However, in other embodiments, physical distinction between storage system 201 and database servers 202 is not necessary.

In an embodiment, a storage system 201 comprises persistent cache devices 210, primary storage devices 220, cache metadata 230 and one or more processors 270. Persistent cache devices 210 may include persistent cache devices 210-1 . . . 210-$n$, and primary storage devices 220 may include primary storage devices 220-1-1 . . . 220-$n$-$s$. Each of persistent cache devices 210 serves as a cache for a particular set of one or more primary storage devices 220. For example, persistent cache device 210-1 serves as a cache for primary storage devices 220-1-1 . . . 220-1-1-$p$, while persistent cache device 210-$n$ serves as a cache for primary storage devices 220-$n$-1 . . . 220-$n$-$s$. In an embodiment, this disclosure refers to grid disks, which are either persistent storage devices 220 themselves, or "virtual" disks created by partitioning persistent storage devices 220.

Storage system 201 comprises one or more subcomponents implementing logic for storing, managing, and providing access to the data stored at primary storage devices 220. The subcomponents may be implemented, for example, by hardware and/or one or more software processes executing on one or more processors 270 in storage system 201. Storage system 201 may comprise a variety of subcomponents, including, for instance, a storage controller and/or storage driver for implementing conventional data I/O operations and management tasks with respect to the data stored in primary storage devices 220.

In computer technology, memory devices can be volatile or non-volatile. A volatile memory device does not store data after the device is powered off, while a non-volatile memory device continues to store data after the device is powered off. When the non-volatile memory device is powered back on, the data that was previously stored on the device can be read. Examples of non-volatile memory devices include disk drive devices, flash memory devices, and storage servers.

Persistent cache devices 210 and primary storage devices 220 may be implemented as non-volatile memory devices. In an embodiment, a persistent cache device 210 is implemented as a fast-access memory device, such as a solid-state disk, while a primary storage device 220 is implemented as a slow-access memory device, such as a hard disk or RAID array. Hence, a persistent cache device 210 may be configured to provide access to data faster than a primary storage device 220. However, in other embodiments, such a distinction is not necessary. Nonetheless, usually a primary storage device 220 holds more data than a persistent cache device 210.

Persistent cache device 210 may be a small, high-speed magnetic disk drive connected to a larger low-speed magnetic disk device such as a primary storage device 220. Implementations of persistent cache device 210 may vary. For example, persistent cache device 210 may be implemented as a flash memory device, also referred to as flash cache. In the description below, the references to persistent cache device 210 may indicate a flash cache, or any other suitable type of cache device. In an embodiment, each persistent cache device 210 may be similar to caching system 110, and/or the combination of processor(s) 270 and cache metadata 230 with primary cache devices 210 may be used to implement a caching system 110. In other embodiments, the combination of processor(s) 270 and cache metadata 230 with primary cache devices 210 may be used to perform the described caching techniques using arrangements of components other than caching system 110.

Database server 202 may be configured to communicate with storage system 201 and to perform operations requested by client applications. An example of a database server 202 is a multi-node database server, with each node running an instance of a database server and having shared access to storage system 201. Database server 202 may be configured to request data from storage system 201, receive data from storage system 201, send data to storage system 201, and otherwise communicate with storage system 201.

A storage system 201 is configured to manage receiving, storing and retrieving data. Storage system 201 may receive requests from database server 202. For example, storage system 201 may receive a request from database server 202 to retrieve a particular data block from either primary storage device 220 or persistent cache device 210.

In an embodiment, storage system 201 implements functionalities of an enhanced storage system, described above.

In an embodiment, storage system 201 operates in a "block mode." A block mode is a mode in which storage system 201 provides a client access to read or write data blocks stored in persistent storage 220. Clients retrieve data blocks from storage system 201 in block mode by issuing block requests to storage system 201.

To support reading from and writing to storage system 201 in a block mode, data stored in a primary storage device 220 is organized in data blocks. A data block may have an associated data block address, which uniquely identifies the data block and the data block location within primary storage device 220.

Storage in persistent cache device 210 may also be organized by data blocks. As copies of various base data blocks are read from primary storage device 220, the copied data blocks may be stored in persistent cache device 210 as cache copy data blocks ("cache copies"). Usually, a data block in a cache copy has the same major format as the base data block of which the cache copy was made.

Storage system 201 may also operate in a mode referred to as a "smart block mode." In the smart block mode, storage system 201 performs one or more operations on the data blocks requested by a storage server client. The operations may transform the content of the data blocks before the data blocks are returned to database server 202.

Storage system 201 may operate in smart block mode in response to a "smart scan request" issued by database server 202. A smart scan request specifies the requested data blocks, the operation to be performed on the requested data blocks, and one or more filtering criteria. For example, database server 202 may issue a "smart scan request" to request data blocks that have only the rows that are filtered according to one or more filtering criteria. In response, storage system 201 retrieves the data blocks from persistent storage 220, filters rows in the data blocks, and returns the data blocks containing only the rows that satisfy the filtering criteria.

As mentioned, persistent cache devices usually have smaller storage capacity than primary storage devices. Hence, the quantity of cached copies in persistent cache devices 210 is usually smaller than the quantity of data blocks stored in primary storage devices 220. Storage system 201 tracks the data blocks that have been copied from primary storage device 220 to persistent cache device 210, and stores metadata, within cache metadata 230, that reflects the mapping between the primary storage device blocks and the copies of data blocks in persistent cache device 210. Cache metadata 230 may further store a variety of other metadata, such as that described with respect to cache metadata 130.

FIG. 2 is but one example of a system in which the described techniques may be practiced. Other systems may include fewer or additional elements in varying arrangements. For example, the techniques described herein also apply to embodiments where the persistent cache devices 210 are deployed outside of storage system 201, between storage system 201 and database server 202. Also, for the purpose of explanation, FIG. 2 depicts one storage system 201 and one database server 202; however, various embodiments may include any number of storage systems 201 and any number of database servers 202. Other aspects of suitable system architectures for performing the techniques described herein are described, for example, in: U.S. Ser. No. 12/563,073, filed Sep. 18, 2009; U.S. Ser. No. 12/562,984, filed Sep. 18, 2009; and U.S. Ser. No. 12/631,985, filed Dec. 7, 2009. The contents of each of the foregoing applications is hereby incorporated by reference for all purposes as is set forth in their entireties herein.

An example of a device upon which an embodiment of the present invention may be implemented is a storage device described in U.S. patent application Ser. No. 13/840,811, entitled Method To Accelerate Queries Using Dynamically Generated Alternate Data Formats In Flash Cache, filed by Juan Loaiza, et al. on Mar. 15, 2013, the content of which is incorporated herein by reference, and herein referred to as Loaiza. This patent application describes a flash enabled device referred to therein as a storage device, which is an example of a cell or cell server. A storage device is described in U.S. application Ser. No. 13/485,557, Rapid Recovery From Loss Of Storage Device Cache, filed by Juan R. Loaiza, et al. on May 31, 2012, the content of which is incorporated herein by reference. This patent application also describes a flash enabled device referred to therein as a storage device, which is an example of a cell or cell server.

2.8. Cache Structure

A cache is a segment of memory divided into substructures called "cache lines" or "buffers," interchangeably. The size of a cache line may vary from cache to cache and/or system to system. Each cache line is associated with various items of metadata, such as information about what data is in the cache line, cache line usage statistics such as when and/or how often the cache line has been accessed, and so forth.

3.0. Functional Overview

The techniques described herein involve differentiating between cacheable data based on data access patterns associated with the data, such as whether the data is classified as "scanned data" or "OLTP data." In an embodiment, a method for practicing the techniques described herein comprises determining whether data accessed in an I/O operation is scanned data or OLTP data. Responsive to the data being scanned data, the method comprises determining whether to cache the data based on a first policy. Responsive to the data being OLTP data, the method comprises determining whether to cache the data based on a second policy.

The policies applied may be any suitable policies. For example, in one embodiment, the caching policy for OLTP data is to always replace a lowest priority set of cached data with the newly accessed data. The scanned data policy, on the other hand, may be to only replace a lowest priority set of cached data with the newly accessed data if the newly accessed data has been accessed above a certain amount of times over a certain period of time. As another example, the OLTP caching policy may be to cache OLTP data in certain designated buffers. The corresponding scanned caching policy may be to cache scanned data in other designated buffers. As yet another example, a caching policy for OLTP data may be to, by default, designate OLTP data within the cache as KEEP items, as described in U.S. Ser. No. 12/631,985. A corresponding caching policy for scanned data may be to, by default, not designate scanned data within the cache as KEEP items.

A variety of other suitable caching policies may be applied to scanned data or OLTP data, of varying complexity. Furthermore, one or more other policies that do not differentiate between scanned data and OLTP data may be applied before or after a scanned data policy or OLTP data policy.

3.1. Caching Process Flow

Figure 3:
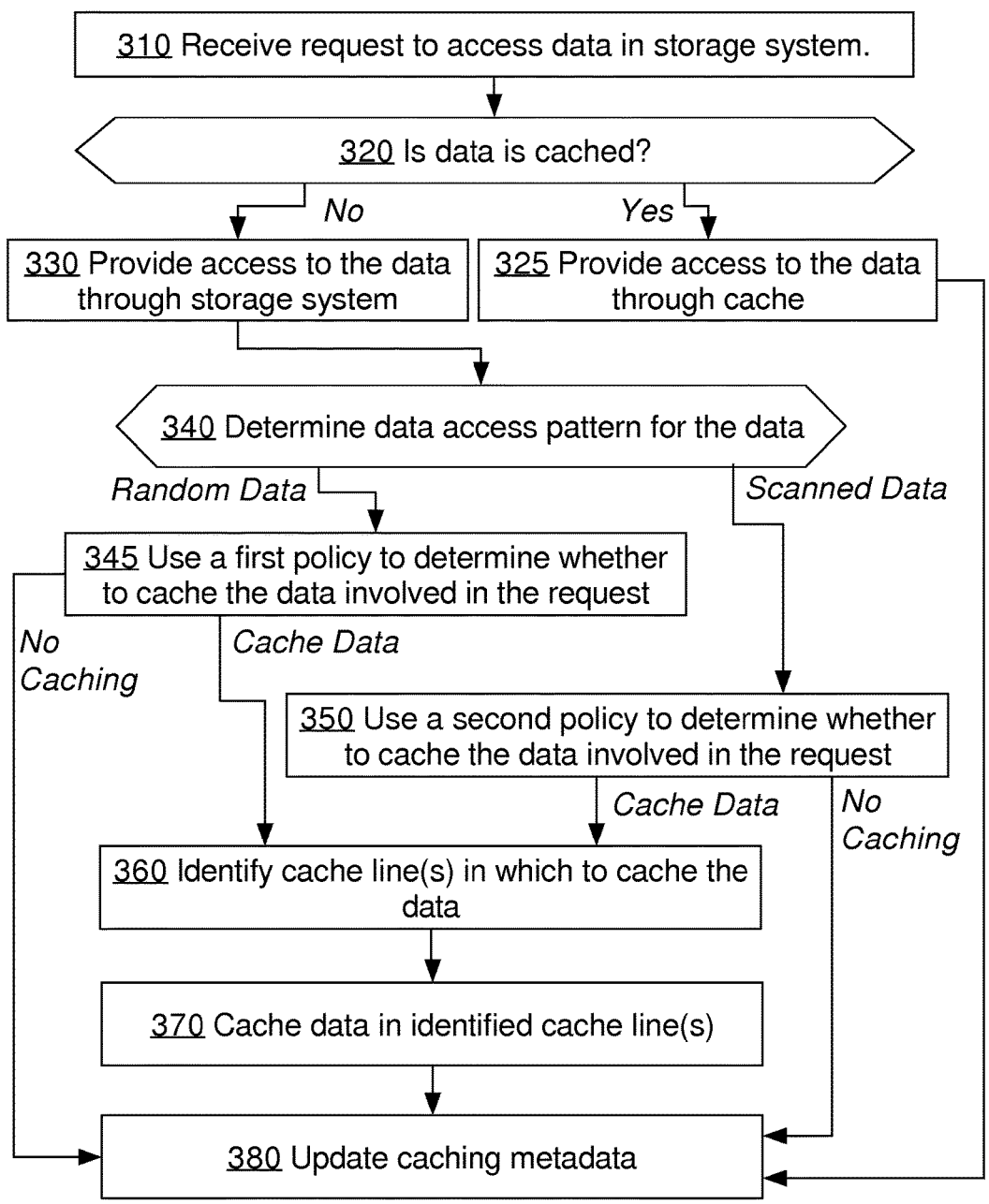
FIG. 3 illustrates an example flow for caching data in a caching system deployed between a database server and a storage system.

FIG. 3 illustrates an example flow 300 for caching data in a caching system deployed between a database server and a storage system, according to an embodiment. The various elements of flow 300 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 310 comprises receiving a request from a database server, such as a database server 102 or 202, to access data in a storage system, such as a storage component 120 or storage system 201. The request may be received at a caching system such as caching system 110, or any other suitable cache. The request may be, for instance, an I/O request to read or write one or more raw data blocks stored in the storage system. In an embodiment, the request may optionally include request metadata, such as an indicator of a data access pattern for which the request is made, a customer identifier, filtering instructions, and so forth. Flow then proceeds to block 320.

Block 320 comprises determining, at the caching system, whether the data is cached. For instance, data block identifiers or addresses specified in the request may be compared to cache mapping data to determine if any cache line(s) stores the relevant data blocks. If the data is cached, then flow proceeds to block 325. Otherwise, flow proceeds to block 330.

Block 325 comprises providing access to the data through the cache, either by retrieving the data from the appropriate cache lines, or by writing to the appropriate cache lines. Flow then proceeds to block 370.

Block 330 comprises providing access to the data through the appropriate storage system. For instance, the caching system may forward the request to the storage system that stores the data involved in the request. The storage system retrieves or writes the data involved in the request. If any data is retrieved, the storage system may return the data to the caching system, which forwards it to the requesting database server. Flow then proceeds to block 340.

Block 340 comprises determining, at the caching system, a data access pattern for the data. The data access pattern is an access pattern associated with a type of operation for which the requesting database server is accessing the data (or appears to be accessing the data). For instance, this determination may involve determining whether to classify the data as scanned data (indicating a scan data access pattern) or OLTP data (indicating a random access data pattern). Any suitable technique for making such a determination may be utilized, and example techniques are described subsequently. Note that classification techniques involving classifications other than scanned data and/or OLTP data may also be used to indicate an appropriate data access pattern. If the data access pattern is a random access pattern, flow proceeds to block 345.

Block 345 comprises using a first policy to determine whether to cache the data involved in the request. For example, an example first policy may be to always cache the data. Another example first policy may be to cache the data if it has an access count above a certain threshold, or above an access count associated with a lowest priority cache line within the cache (e.g. one of the cache lines in the LRU).

If, at block 340, the determined data access pattern is a scanned data access pattern, flow proceeds to block 350. Block 350 comprises using a second and different policy to determine whether to cache the data involved in the request. For example, a second policy may involve determining whether to cache the data based on one or more of: which data access patterns are associated with the data cached within a LRU, access counts associated with the data involved in the request and the cached data, and/or access timestamps associated with the data involved in the request data and the cached data.

A more specific example policy is to cache the data under one or more of the following conditions. First, if a sufficiently sized set of data eligible for replacement in the cache (e.g. the lowest priority data, or cache lines indicated by the LRU) is associated with a scanned data access pattern, then the data involved in the request will be cached in its place assuming that the data involved in the request has a timestamp more recent than any of the data in the set and that the data involved in the request has an access count that is both higher than a threshold amount and higher than that of any of the data in the set. Second, if a sufficiently sized set of data eligible for replacement in the cache is associated with a random data access pattern, then the data involved in the request will be cached in its place assuming that the data involved in the request has a timestamp more recent than any of the data in the set, that the data involved in the request has an access count that is higher than a threshold amount, and that the data involved in the request has a weighted access count that is higher than any access count associated with the data in the set.

For purposes described herein, an access count is "weighted" if, in a comparison to another access count, one of the access count or the compared access count is adjusted by some factor that the other of the access count or the compared access count is not adjusted by. This adjustment may involve multiplying the access count and/or the compared access count by some factor(s), increasing or decreasing the access count and/or the compared access count by unequal amounts, and/or performing any other calculations such that an otherwise equivalent access counts would not be considered equivalent once one of them was weighted. The access count of the scanned data may be weighted using different factors in different embodiments. In an embodiment, the weights may be user-configurable. In an embodiment, the weights may be a function of various other characteristics of the data.

A variety of other policies are also possible, including various permutations of the above described criteria. As yet another example consideration for a policy is that scanned data may only replace OLTP data in the cache if doing so would not cause the total amount of OLTP data in the cache to fall below a certain minimum amount of space. Other examples of policies are described, without limitation, in other sections of this disclosure.

If it is determined in either of blocks 345 or 350 to cache the data, flow proceeds to block 360. Otherwise, flow proceeds to block 380. Block 360 comprises identifying a sufficiently sized set of cache lines in which to store the data involved in the request. The set of cache lines may be selected, for instance, from a set of "freeable" cache lines or any other suitable set of one or more of the lowest priority cache lines. In some embodiments, the cache lines to be replaced may already have been determined when applying the policy in block 345 and/or block 350, and block 360 is thus performed concurrently with block 345 and/or block 350. In an embodiment, the logic used to identify a suitable set of cache lines differs based on the data access pattern determined in block 340. For instance, in an embodiment, OLTP data may replace any type of cache line, whereas scanned data may only replace cache lines storing cached data that meets certain criteria. From block 360, flow proceeds to block 370.

Block 370 comprises caching the accessed data in the identified cache lines. In some embodiments, the selected cache lines may have previously been marked as "dirty," indicating that they store data that has been changed in the cache but not in the storage system. Thus, the caching system may "flush" the data in these lines to the storage system before the data is replaced, using any suitable caching technique(s). From block 370, flow proceeds to block 380.

Block 380 comprises updating the cache metadata. A variety of metadata may be added or updated as a result of block 380. The last access timestamp(s) for the data involved in the request, such as found in access timestamps 135, may be updated with the timestamp corresponding to the time at which the request was received. The access count(s) for the data involved in the request, such as found in access counts 136, may be incremented by a designated amount, which may or may not vary depending on the data access pattern associated with the data and/or other factors.

If the data involved in the request was added to the cache, then block 380 may comprise updating cache mapping data, such as cache line mapping data 132, to reflect the change. If the data involved in the request was added to the cache or already found in the cache, then classification data such as classification data 134 may also be updated to indicate the data access pattern associated with the data and/or the request. Furthermore, the priority data may be adjusted based on the request. For instance, if the data involved in the request was added to the cache or already found in the cache, then the cache line(s) in which the data is stored may be removed from the LRU, or priority data such as priority data 138 may otherwise be adjusted to increase the caching priority of the data involved in the request.

Block 380 may furthermore comprise cooling access counts for data not involved in the request by a designated amount, which may or may not vary depending on the data access pattern associated with the data, the time at which the data was last accessed, and/or other factors. Alternatively, this cooling may be performed asynchronously relative to any request, such as at scheduled intervals or whenever a certain number of bytes has been accessed (e.g. an amount of bytes equivalent to the total amount of bytes that may be cached within the caching system). In yet other embodiments, the access counts may be calculated dynamically from access logs as needed for policy determinations and/or other determinations. No cooling process may therefore be needed, since an equivalently skewed access count may be calculated based on comparing the current time with times associated with each access.

Flow 300 may then be repeated any number of times with respect to any given request to access any given data stored in a storage system for which the caching system caches data.

Flow 300 is one example of a flow for caching data. Other flows may comprise fewer or additional elements, in varying arrangements. If the granularity of the cache is such that the data involved in the request comprises multiple, separately-cacheable units, then the appropriate one of blocks 345 and 350, along with block 360 if warranted, may be repeated for each cacheable unit. In an embodiment, only some of the data involved in the request is cached. Flow may proceed along block 325 with respect to the cached portion of data at the same time flow proceeds along block 330 with respect to the uncached portion. The policies may be adjusted to take into consideration the fact that some of the data involved in the request is already cached. In an embodiment, some or all of blocks 340-380 may be performed before block 330. In such embodiments, if the accessed data is to be cached, the data may be retrieved from the storage system and cached before the caching system provides the requested access to the data.

The sequence of blocks in flow 300 is for illustrative purposes only. The blocks may be performed in a variety of different sequences, and various blocks may be performed concurrently with other blocks. For instance, the caching system may begin performing block 380 as soon as the request is received in block 310, and continued performing block 380 as needed throughout flow 300.

3.2. Differentiating Between Scanned Data and OLTP Data

In some embodiments, the terms "scanned data," "scanned block," "DW data," and "DW block" in this application refer to data that has recently been accessed by a scan operation. More specifically, data is considered to be scanned data when the purpose for which that data, or its underlying disk representation, was most recently accessed was to perform a scan operation. Similarly, the term "OLTP data" refers to data that has most recently been accessed for completing an OLTP operation. In some embodiments, since the classification of data as scanned data or OLTP data is related to the operation for which the data was accessed, the classification may be relative to a particular context. For instance, the same data may be "scanned data" relative to a particular storage system and/or time frame, but not "scanned data" relative to another storage system and/or time frame.

In an embodiment, scanned data and OLTP data is differentiated based on, for example, metadata indicating what operation is associated with an I/O request in which the data was accessed. This metadata may be stored in association with the data in the cache. In another embodiment, data blocks may be associated with fixed metadata that specifically designates certain data blocks as being for scanned data or OLTP data, such as metadata stored within the data block, or metadata associated with a table, database, or other database object to which the data block belongs.

In some embodiments, it is not always possible (or in some cases ever possible) to ascertain the operation for which a given data unit is being requested. Consequently, the data is classified as scanned data or OLTP data based on other factors selected to predict the operation for which the data was accessed. In one such embodiment, data blocks requested in operations that request more than a threshold amount of data are assumed to have been scanned, and thus treated as scanned data, unless associated with a specific instruction to the contrary. Meanwhile, data blocks requested in operations that request less than a threshold amount of data (e.g. ~128 KB) are assumed to be OLTP data, and thus treated as OLTP data unless associated with a specific instruction to the contrary. In another embodiment, if data blocks are not of fixed size, the size of a data block may be considered in differentiating scanned data and OLTP data. For example, data blocks below a threshold size may be assumed to be OLTP data, while data blocks above a threshold size may be assumed to be OLTP data.

Any other suitable technique may also or instead be used to differentiate between "scanned data" or "OLTP data." For instance, logic and/or functions based on any one or more of the foregoing factors may be used to calculate scores indicating likelihoods that a given data unit is scanned data or OLTP data. Based on such scores, the data unit may be classified as scanned data or OLTP data for the purposes of the techniques described herein. Pattern recognition or machine learning algorithms may also be utilized in such scoring processes.

The classification of cached data as being scanned data or OLTP data relative to a particular context may be, but need not necessarily be, a binary determination. For instance, some policies may be applied just on cached data blocks that are classified as highly likely to be scanned data based on some specified threshold, while other policies may be applied to any cached data blocks that are more likely to be scanned data than OLTP data. Moreover, in other embodiments, additional classifications of data other scanned data and OLTP data may be used, and policies may also be generated for these other classifications.

Once data has been classified as scanned data or OLTP data, such as upon the data being received at the cache or upon a classification of the data first being needed, metadata indicating the associated classification may be stored for future reference so as to avoid the computational expense of making the classification again. The classification process may be repeated, with potentially different results, periodically or at some other interval. Or, no classification need be stored, and the classification process may be repeated every time the classification is needed.

3.3. Example Process Flow for a Scanned Data Policy

Figure 4A:
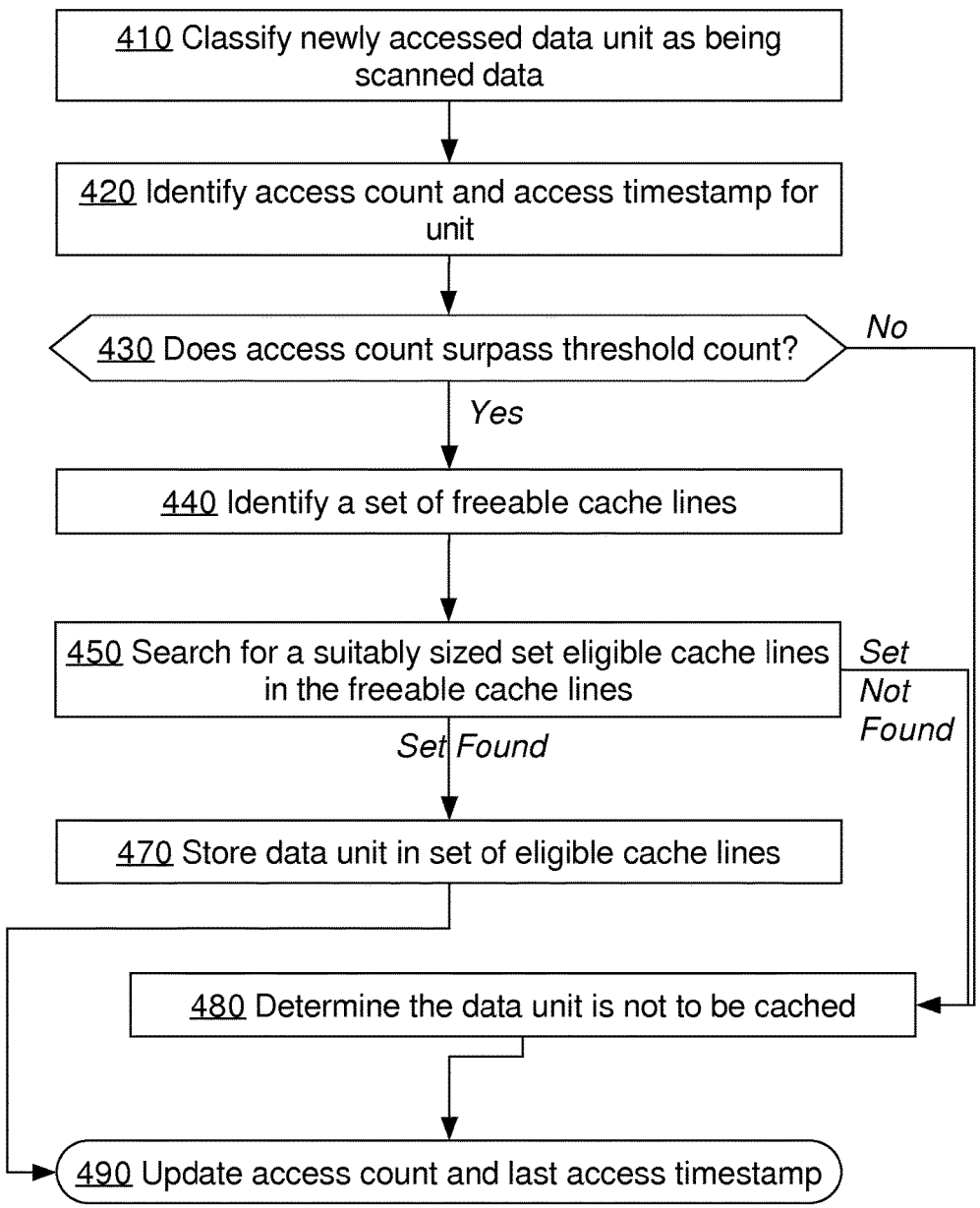
FIG. 4A illustrates an example process flow for handling scanned data at a caching system.

FIG. 4 illustrates an example process flow 400 for handling scanned data at a caching system, according to an embodiment. The various elements of flow 400 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. In an embodiment, flow 400 illustrates the application of an example "second" policy within the meaning of block 350 of FIG. 3.

Block 410 comprises classifying a newly accessed data unit as being scanned data, or otherwise associated with a scanned data access pattern. Flow then proceeds to block 420, which comprises identifying an access count and access timestamp associated with the newly accessed data unit. In embodiments with multiple types of access counts, the access count may specifically be, for instance, a scan access count.

Flow then proceeds to block 430, which comprises determining whether the access count surpasses a designated threshold count defined for scanned data. If the access count surpasses the threshold count, then flow proceeds to block 440. Otherwise, flow proceeds to block 480.

Block 440 comprises identifying a set of freeable cache lines, such as a set of cache lines in an LRU or any other set of lower priority cache lines. Flow then proceeds to block 450, which comprises searching for a suitably sized set of one or more eligible cache lines in the set of freeable cache lines. If a suitably sized set is found, flow proceeds to block 470. Otherwise, flow proceeds to block 480.

Figure 4B:
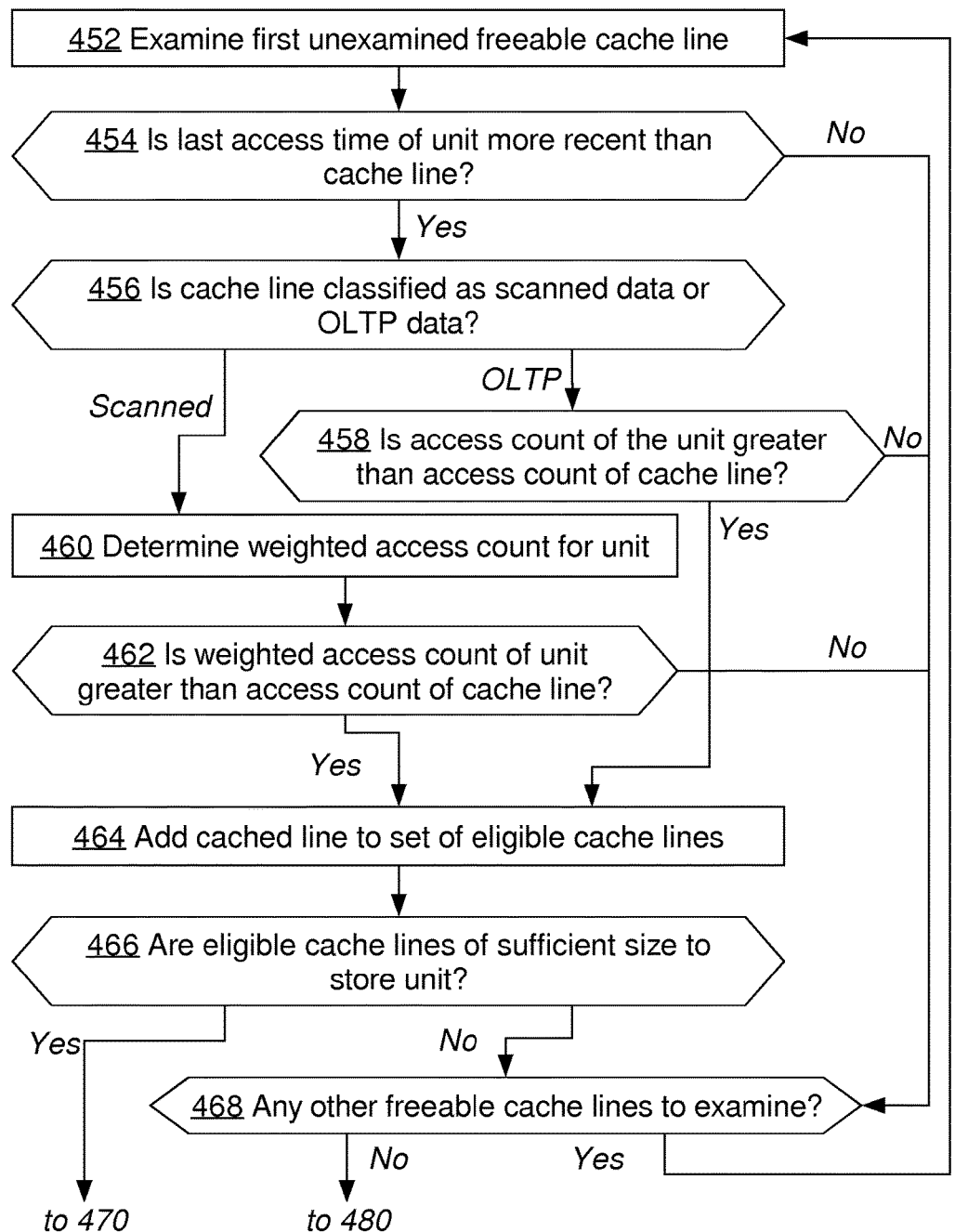
FIG. 4B illustrates an example process of searching for a suitably sized set of one or more eligible cache lines exists in the set of freeable cache lines.

FIG. 4B illustrates block 450 in further detail, according to an embodiment. As illustrated, block 450 comprises blocks 452-468. Block 452 comprises examining the first unexamined cache line in the set of freeable cache lines.

Flow then proceeds to block 454, which comprises determining whether the last access time of the newly accessed data unit is more recent than that of the cache line. According to an embodiment, a first timestamp is only considered to be more recent than a second timestamp if the first timestamp is greater than the second timestamp plus an additional offset long enough to account for potential delays or time synchronization issues, and/or other issues. In other embodiments, no offset is needed. If the last access time of the newly accessed data unit is not more recent than that of the cache line, flow proceeds to block 468. Otherwise, flow proceeds to block 456.

Block 456 comprises determining whether the data in the cache line is classified as scanned data or OLTP data. If the data in the cache line is classified as OLTP data, then flow proceeds to block 458. If the data in the cache line is classified as scanned data, then flow proceeds to block 460.

Block 458 comprises determining whether the access count of the recently accessed data unit is greater than (or, in some embodiments, equal to) the access count of the data in the cache line. If not, flow proceeds to block 468. If so, then flow proceeds to block 464.

Block 460 comprises determining a weighted access count for the recently accessed data unit by, for instance, multiplying the recently accessed data by an appropriate factor to compensate for a cost/benefit analysis of replacing OLTP data with scan data. Note that block 460 may instead technically involve various other equivalent calculations, such as multiplying the access count of the data in the cache line by an inverse of the appropriate factor. For simplicity, each equivalent calculation is deemed to effectively weight the access count for the recently accessed data, and thus be within the meaning of determining a weighted access count for the recently accessed data unit.

Flow the proceeds to block 462, which comprises determining whether the weighted access count of the recently accessed data unit is greater than (or, in some embodiments, equal to the access count of the cache line. In some embodiments with multiple types of access counts, the comparison may be between different types of access counts. For instance, the comparison may be of the recently accessed data unit's scan access count (reflecting accesses in scan operations) to the cache line's total access count (reflecting accesses in all operations). If the weighted access count of the recently accessed data unit is greater than the access count of the cache line, the flow proceeds to block 464. Otherwise, flow proceeds to block 468.

If the check of block 458 or block 462 is affirmative, then at block 464, the cache line is added to a set of eligible cache lines. Flow then proceeds to block 466, which comprises determining whether the set of eligible cache lines is of sufficient size to store the recently accessed data unit. For instance, if each cache line is one megabyte in size, and the scanned data block is four megabytes in size, the set of eligible cache lines would need to include four cache lines. If the set of eligible cache lines is of sufficient size to store the recently accessed data unit, then flow proceeds to block 470. Otherwise, flow proceeds to block 468.

Block 468 comprises determining whether any other freeable cache lines are left to be examined. If so, flow returns to block 452. Otherwise, flow proceeds to block 480.

Returning to FIG. 4A, block 470 comprises storing the recently accessed data unit in the set of eligible cache lines. Flow then proceeds to block 490. Block 480 comprises determining that the recently accessed data should not be cached. Flow then proceeds to block 490.

Block 490 comprises updating the access count and last access timestamp of the recently accessed data unit.

Flow 400 may be repeated any number of times with respect to any number of data units that are classified as scanned data. Note that the available freeable blocks may vary from iteration to iteration on account of both the previous iteration, which may result in at least some of the freeable cache lines storing new data and thus no longer being freeable for a time, as well as other cache usage between iterations.

Flow 400 is one example of a flow for handling scanned data. Other flows may comprise fewer or additional elements, in varying arrangements. For instance, one or more of blocks 430 and 454-458 may be possible, or additional factors may be considered before performing block 470. The sequence of blocks in flow 400 is for illustrative purposes only. The blocks may be performed in a variety of different sequences, and various blocks may be performed concurrently with other blocks.

3.4. Weighting the Access Counts

In an embodiment, scanned data blocks and OLTP data blocks are both cached based on a comparison of their access counts relative to access counts already in the cache. However, for purposes of the comparison, the access count of an OLTP data block may be weighted relative to the access count of a scanned data block. The weighting may be based on a cost/benefit analysis quantifying the cost associated with replacing OLTP data blocks with scanned data blocks. The costs and benefits may be based on, for instance, typical sizes of the cache lines, OLTP data blocks, and/or scanned data blocks. The costs and benefits might also or instead be based on how many I/O operations are needed to cache typical OLTP data blocks and scanned data blocks. Other factors may also be considered. There may be a universal weight for all such caching decisions. Or, the weight may vary based on the scanned data block and/or the OLTP data blocks that are potentially being replaced.

For example when a 1 MB DW block is cached, it could potentially replace sixteen 64 KB cache lines, each of which could be holding a separate OLTP data block. Assume that caching a 1 MB scanned block would cost three 8 KB I/O operations, whereas caching 16 random cache lines is equivalent to sixteen random 8 KB I/O operations. To account for the difference in benefit between caching OLTP data as opposed to DW data, the access count for a scanned data block may be weighted down by a factor 3/16. Thus, for example, a one MB data block would need to be scanned more than five times to replace a set of sixteen OLTP cache lines having an access count 1.

3.5. Example Scanned Data Caching Policies

In some embodiments, scanned data should not be cached until caching that data has been proven useful. In one such embodiment, to determine whether a scanned data block can be cached or not, disk block usage statistics such as an access count and a last access time stamp are tracked in a tracking array. A scanned data block would be eligible for caching whenever its access count goes beyond a scan data access count threshold, which may vary depending on the environment or even based on the access counts of items already in the cache. Once a scanned data block is eligible for caching, then the block's usage stats would be compared with cache line usage statistics to determine whether the eligible block should replace an existing buffer in cache.

In an embodiment, a scanned block's usage statistics, such as access count and time stamp, is updated every time a block is read regardless of whether the block is cached or not. In an embodiment, a scanned block's access count is decreased over time to "cool" the count down, and make way for newer "hot" blocks. In an embodiment, access counts are cooled relative to their last access time, so that the rate of decaying of the access count is directly proportional to how long it has been since they were accessed.

In an embodiment, a scanned block is cached if and only if the following three conditions are met. First, the scanned block's access count should be greater than the scan data access count threshold. Second, the scanned block's last time stamp should be greater than the time stamp of the cache header from the least recently used unit (LRU) in the cache, as determined based on the cache line usage statistics. Third, the scanned block's scan access count should be greater than the normal access count of the cache header from LRU.

In an embodiment, there is a ceiling on the maximum number of scan buffers that can be cached. There is a quota reserved for the OLTP buffers, and scan blocks can only occupy the cache lines excluding the OLTP quota, so that way an administrator can control how much scan data is cached.

4.0. Example Implementation Details

4.1. LRU Lists

In an embodiment, a cache may maintain one or more kinds of LRU lists. A main LRU list is a list of normal "hot and cold" cache lines, as represented by their respective cache headers. A freeable LRU list is an auxiliary list of free-able cold cache headers. The lists may be sorted based on various suitable factors including, without limitation, a function of the respective access counts of their respectively represented cache lines. Of course, fewer or additional LRU lists may be used. An LRU list may comprise both OLTP data and scan data.

In an embodiment, a simple access count based LRU cache header replacement policy may be used to find a free cache header. Every LRU cache header maintains the access count that would be bumped up whenever that particular cache header has been accessed. An access of the cache header causes an access count increment but does not move the cache header each time to the head of the list. Replenishing of the main LRU list moves the frequently accessed elements to the head, and coldest cache headers to the freeable LRU list. Free cache headers may then be fetched from the freeable LRU list. Replenishing of the buffers from the main LRU list to the freeable LRU list may be initiated in response to various triggers. For example, replenishing may occur after every 128 fetches of the freeable LRU list, if the total freeable buffers fall below 8K.

While replenishing the buffers from the main LRU list to the freeable LRU list, all cache headers that have a replenishing access count less than replenishing threshold limit (e.g. four) would be moved to freeable LRU list. Cache headers that have a replenishing access count greater than the threshold limit would be moved to the top. Thus, hot buffers would stay in the main LRU list as long as they have been accessed frequently. Note that, in contrast to traditional RDBMS buffer caches, caching in this manner simply results in a "best guess" LRU, which does not necessarily correspond to the actual LRU.

4.2. Tracking the Scan Block's Usage Statistics

In an embodiment, cache metadata in the form of a usage statistics look-up array is allocated per grid disk in a storage system at the time of grid disk creation. This array is created only for the grid disks that have caching enabled. To reduce the memory and CPU overhead, in some embodiments, usage history is tracked at the 4 MB granularity, though other granularities may be used. The array is allocated of sufficient size to account for all contiguous blocks of the specified granularity in that particular grid disk, based on its virtual size. The usage statistics (e.g. access count, time stamp) may be updated every time a block is read regardless of whether the block is cached.

In an embodiment, the scan block size used in I/O requests is configurable, and tracking of block usage occurs at a granularity that is the same as the configurable scan block size. Statistics are updated whenever the offset of an I/O request meets the boundary of the scan block size, regardless of whether the I/O request is a smart scan or a non-smart scan. In an embodiment, for smart scans, a single I/O request may be chopped into multiple I/O requests. For instance, if the scan block size is configured to to be 4 MB, a single 4 MB I/O request may be chopped into multiple 1 MB I/O request. Accordingly, if tracking is set at the granularity of the scan block size, for smart scans, the block usage history may be recorded only for the first portion (e.g. 1 MB) of the scan block (e.g. 4 MB) region. For non-smart scans, block usage history would tracked only for the offsets that meet the boundary of the scan block size. However, other tracking policies may be employed in other embodiments.

The scanned blocks may be placed in the same cache LRU lists as OLTP blocks. This means that if, for example, OLTP blocks are of a default 64 KB size, a 4 MB scanned block may be cached into sixty-four 64 KB cache line entries in the cache. Since, in some embodiments, I/O requests are chopped into smaller (e.g. 1 MB requests) it may be possible that the cache only partially caches a 4 MB block.

4.3. Reserving the Cache for OLTP Buffers

In an embodiment, there is a ceiling on the maximum amount of scan data that can be cached. There is a quota reserved for the OLTP buffers. This quota may or may not be independent from other quotas, such as a KEEP pool reserved for data marked with a KEEP designation. By default, in an embodiment, the quota is set to 50%. However, other default quota sizes are also possible. Scan blocks can only occupy the cache lines excluding the OLTP quota (and, in some embodiments, KEEP) cache lines, so as to ensure that reservation of the OLTP buffers is always guaranteed.

To support the OLTP quota, metadata tracks which cache lines are occupied by OLTP buffers. In an embodiment, this metadata is in the cache header. Thus, each cache header has an extra bit that indicates whether it is OLTP or scan cache line. The extra bit may be updated every time the cache line is accessed. Any other suitable metadata representation may instead be used.

4.4. Access Counts

In an embodiment, each cache header has an replenishing access count that is updated every time a block in that cache line gets accessed. In some embodiments, whenever the replenishing process is performed, this replenishing access count is re-adjusted. Hence, these access counts cannot be used to compare with the access count in the usage statistics array. Thus, in addition to the replenishing access count in the cache header, a normal access count is tracked in the cache header, which can be used to compare with a scan access count in the usage statistics array. Thus, there is an adjusted access count for replenishing operations and a normal access count for other purposes. Both are updated whenever a block in that particular cache line is accessed. The replenishing access count is cooled off by the replenishing job. The normal access count in the cache header is cooled off along with the access count in the usage statistics array.

In summary, in some embodiments there may some or all of the following access counts. The replenishing access count, which may be maintained in for instance the cache header, is updated every time the cache line is accessed. This count is used for aging the LRU buffers, and will be readjusted by replenishing task. This access count is only effective as long as the cache header is in the main LRU list. The normal access count, which may be maintained for instance in the cache header, is also updated every time the cache line is accessed. The count is compared against the last access count of the block from the usage statistics array. The count will be cooled off along with the scan access count. The scan access count, which may be maintained in for instance the usage statistics array, is updated every time that particular block is scanned regardless of whether the block is currently cached. Other embodiments may include other types of access counts.

4.5. Cooling the Access Counts

In an embodiment, to cool the scan access count and the normal access count, scan block and cache header access counts are grouped into multiple decay zones based on their last access time. For instance, there may be different zones for different time periods, such as different hours or days. The time period of each zone need not be fixed. For instance, the time period covered by the most recent zone may be relatively small, and the time periods associated with other zones may grow in size with the age of the zone. In other embodiments, any other suitable age-based schemes may be utilized for dividing access counts into zones. All the access counts in a zone are decayed uniformly. Each zone is associated with a different decaying factor, which indicates by how much each access count in a zone is reduced during each iteration of the cooling process. For instance, a suitable function for reducing an access count may be, without limitation: $count_{new} = count_{old} - (count_{old} * decayfactor_{zone})$, where $count_{old}$ is the access count before the iteration of the cooling process, $count_{new}$ is the access count after the iteration of the cooling process, and $decayfactor_{zone}$ is the decaying factor associated with the zone.

The decaying factor grows with the age of the zone. For instance the zones may be sorted based on age, and the decay factor for each successive older zone is double (or some other fixed factor) that of the immediately younger zone. In an embodiment, the oldest zone may have a decay factor of 1, the second oldest zone may have a decay factor of ½, the third oldest zone may have a decay factor of ¼, and so forth. In other embodiments, a variety of other techniques may be utilized to gradually increase the decay factor with the ages of the access counts.

Some embodiments employ two different cooling processes, repeated at two different intervals. The first process is performed when finished reading (or attempting to read) a total number of bytes equivalent to the cache size. The second process is performed on timely basis (e.g. every few minutes), if there was no cooling taken place by the first process during that time period. In other embodiments, only one of these two different processes is utilized.

In an embodiment, the blocks in the usage statistics array are ordered by grid disk offset. Hence the same order is also followed to cool down the cache header's access count.

4.6. Replenishing

As explained above, replenishing of the main LRU list moves frequently accessed elements to the head of the main LRU list, and the coldest cache headers to the freeable list. During the replenishing, cache headers with a replenishing access count below a threshold may be moved to freeable LRU list, and cache headers above the threshold would be moved to the HOT end of the main LRU list. To give more priority to the OLTP buffers over scan buffers, there may in some embodiments be separate weights to the replenishing access count, based on a determined cost/benefit ratio cost, such as the example 3/16 ratio described above. For example, assuming a 3/16 ratio, each time a buffer is accessed, its corresponding access counts may be incremented by 1 for OLTP cache lines, and by 3/16 for scan cache lines. Or, the weight may instead be applied during comparison operations.

In an embodiment, the replenishing touch count for cache headers that are moved to the HOT end of the main LRU list is decayed by a configurable amount, such as 50%. In an embodiment, the replenishing access count for cache headers that are moved to the freeable list are reset to zero.

4.7. Finding Free Cache Lines

Since the freeable LRU list contains the potentially freeable cache lines, in an embodiment free buffers are always fetched from the freeable list only. The replenishing operation ensures that the freeable LRU list always will have a suitable minimum number (e.g. 8K) of buffers available at any time. In an embodiment, scanning the freeable list for the free cache lines is limited by a predefined maximum scan depth to minimize latency to the I/O requests.

While looking for the free cache lines in which to cache a new scan block, the freeable LRU list is scanned for scan cache lines and/or suitably sized sets of OLTP cache lines (not necessarily contiguous). In an embodiment, an existing scan cache line identified in this scan of the freeable LRU list may be selected if it is older than and has a lower access count than the new scan block. A suitably sized set of OLTP cache lines identified in this scan would be chosen if each of the cache lines in the set has an older time stamp than the new scan block, and passes a cost/benefit evaluation. This evaluation may involve various costing factors, including a weighted comparison of access counts between the new scan block and the OLTP cache lines. In an embodiment, a suitably sized set of OLTP cache lines are chosen only if all of the cache lines in the set have a weighted access count that is lower than the scan block, of those identified in the scan (if any), that has the lowest access count.

If an insufficient number of cache lines in the freeable LRU list are free, the new scan block is not cached. In an embodiment, the freeable LRU list is first scanned for existing scan cache lines to replace, and OLTP cache lines are selected only if there are no scan cache lines available.

4.8. Handling Scanned Data that is Already Partially Cached

If only some of the contents of a scanned data block are found in the cache, and the cache lines that store the partial content are in the freeable LRU list, then in some embodiments the entire scanned data block is treated as not being cached. Otherwise, in an embodiment, the caching system may be configured to automatically populate the cache with the remaining pieces of the scanned data block, instead of subjecting the scanned data block to any of the tests described herein. In another embodiment, this occurs only if more than 50% of the scanned data block is cached.

4.9. Administrative Considerations

In an embodiment, an administrator can influence the caching by tuning the access count threshold (when to qualify a scanned block for caching) and the replacement time difference threshold (i.e. how "hot" an item must be before it replaces an existing LRU buffer).

4.10. Miscellaneous

In an embodiment, if there are unused buffers available then the system caches smart scan blocks opportunistically on the first touch. In an embodiment, OLTP data is always cached. In other embodiments, other caching policies apply to OLTP data.

In an embodiment, the scanned data access count threshold may further be utilized to prevent the thrashing caused by the concurrent sessions scanning a large table that is bigger than the total cache size. This is because, when only a timestamp is considered for replacing the buffers, multiple concurrent sessions trying to scan a large table will compete with each other to replace the buffers from the cache. Having the access count in addition to the time stamp prevents the thrashing in the above explained case. This is because, all the sessions would update the access count as they progress their scan. Thus, the access count of the current block would be always greater than or equal to the block next to it. The access count can be used along with the timestamp in the comparison for the buffer replacement. In this manner, the example current block cannot be replaced by the blocks next to it, hence thrashing can be prevented PQ scans can submit non equal granules in random order and can thus cause self-thrashing. Consider a table of 10 GB in size. As it is scanned, the PQ scanning operation divides it into 10 granules of 1 GB size each. The PQ scanning operation queues these granules to all the available server instances in random order based on their work loads. From the storage system perspective, the storage system may receive, for instance, I/O requests for the fifth granule first and then the second granule. This randomness might cause self-thrashing. One technique for avoiding the self-thrashing is to not replace scanned buffers immediately if they belong to the same object, but to instead delay the replacement. That means, when comparing the scan access counts of blocks that pertain to the same database object (e.g. table), the system should make sure the difference between those access counts is greater than a certain threshold.

In an embodiment, an optimization to use the cache space efficiently is to, during the scan, cache only 75% of data and skip the rest of 25%. For example, the system may simply skip every fourth block that has been scanned. Other suitable ratios may also be used.

In an embodiment, the system maintains a configurable divisor (e.g. 1/20) that regulates the number of blocks cached per scan. Thus, for example, a first scan will result in caching up 1/20th of the blocks, and it will take 20 scans to fully get a table into the cache. Thus, the system avoids immediately transitioning from having no data from a table cached to having all data cached. To implement this feature, a quota is maintained per object, and the quota is incremented after each new scan. The quota may be computed based on the total available cache and the number of blocks that are not cached for the object. In an embodiment, the system may further be configured to stop incrementing the quota after a certain proportion of the object has been cached (e.g. 19/20).

In an embodiment, temporary reads are not cached because temporary reads are typically of the form write, read, write, read. If the writes are not be cached, as may be the case in some embodiments, it does not make sense to cache the reads. Thus, an I/O logical characteristic is utilized to differentiate between temporary reads and other reads that are eligible for caching.

5.0. Example Embodiments

Example embodiments are represented in the following numbered clauses:

1. A method comprising: responsive to requests from a database server to access data units stored in one or more storage systems, determining that at least certain data units accessed by the requests are not found in a cache; associating the certain data units with data access patterns, each unit of the certain data units associated with a particular data access pattern of the data access patterns, the data access patterns including a scan data access pattern and a random data access pattern; applying one or more caching policies to determine when to cache particular data units of the certain data units, based at least partially on the data access patterns associated with the certain data units; and storing at least one of the particular data units in the cache responsive to the requests, based on the one or more caching policies.

2. A method comprising: responsive to requests from a database server to access data units stored in one or more storage systems, determining that at least certain data units accessed by the requests are not found in a cache; associating the certain data units with data access patterns, the data access patterns including a scan data access pattern and a random data access pattern; whenever a given data unit of the certain data units is associated with the random data access pattern, determining to store the given data unit in the cache; whenever a given data unit of the certain data units is associated with the scan data access pattern, determining to cache the given data unit: only when a number of cache lines in the cache are determined to be eligible to store the given data unit based at least on which of the data access patterns are associated with existing data already stored in the cache lines and on recent access counts associated with the existing data, the number being of sufficient size to store the given data unit; and/or only when a recent access count associated with the given data unit exceeds a threshold count; and/or only when caching the given data unit will not result in the cache being comprised of more than a threshold percentage of data associated with the scan data access pattern.

3. A method comprising: in a cache deployed between a database server and a storage system, caching data units accessed by the database server; storing recent access counts reflecting how frequently the data units have been accessed over a recent period of time; associating the data units with data access patterns in accordance with which the database server is or appears to be accessing the data units; selecting when to cache data units accessed by the database server, based on the associated data access patterns and the recent access counts.

4. The method of Clause 1, wherein applying the one or more caching policies comprises applying a first caching policy to determine whether to cache first data units, of the certain data units, responsive to the first data units being associated with the random data access pattern; applying a second caching policy to determine whether to cache second data units, of the certain data units, responsive to the second data units being associated with the scan data access pattern, the first caching policy being different than the second caching policy; the method further comprising storing at least a set of the certain data units in the cache responsive to the requests, based on the first policy and the second policy.

5. The method of Clause 1 or 4, further comprising: tracking recent access counts for the data units stored in the one or more storage systems, the recent access counts being based in part on how frequently the data units have been accessed over a recent period of time, the one or more caching policies being based at least partially on the recent access counts.

6. The method of Clause 3 or 5, wherein applying the one or more caching policies or selecting when to cache data units: determining whether to cache a given data unit associated with the scan data access pattern based on comparing the recent access count of the given data unit to a threshold count; determining whether to cache given data unit associated with the random access pattern does not comprise comparing the recent access count of the given data unit to the threshold count.

7. The method of Clause 3, 5 or 6, wherein applying the one or more caching policies or selecting when to cache data units comprises determining whether to cache a given data unit associated with the scan access data pattern by comparing the recent access count of the given data unit to one or more recent access counts for a set of cached data units already stored in the cache, and comparing a last access time of the given data unit to one or more last access times for the set of cached data units already stored in the cache.

8. The method of any one of Clauses 2-7, further comprising adjusting the recent access counts to emphasize more recent accesses of the data units more heavily than less recent accesses.

9. The method of any one of Clauses 2-8, further comprising decreasing the recent access counts over time and/or responsive to an amount of bytes being accessed in the cache.

10. The method of any one of Clauses 2-8, further comprising weighting the recent access counts differently depending on with which of the data access patterns the corresponding data units are associated.

11. The method of any one of Clauses 1-10, wherein the scan data access pattern pertains to data accessed for data warehousing operations, and the random data access pattern pertains to data accessed for OLTP operations.

12. The method of Clause 1, wherein the one or more caching policies includes a first policy to always cache any data unit associated with the random data access pattern.

13. The method of any one of Clauses 1-12, further comprising determining in which cache lines, of a plurality of cache lines within the cache, to store a given data unit, based at least in part on which of the data access patterns is associated with the given data unit.

14. The method of any one of Clauses 1-13, wherein applying the one or more caching policies or selecting when to cache a given data unit associated with the scan data access pattern includes determining to cache the given data unit if a number of cache lines in the cache are determined to be eligible to store the given data unit, the number being of sufficient size to store the given data unit.

15. The method of Clause 2 or 14, further comprising searching for the eligible cache lines only in a set of cache lines designated to be freeable.

16. The method of Clause 15, further comprising determining the set of cache lines that is designated as freeable by one or more of: locating the set of cache lines in one or more least recently used (LRU) data structures; calculating which cache lines in the cache have a lowest priority based at least on one or both of access counts associated with data stored in the cache lines or timestamps indicating times when the cache lines were last accessed.

17. The method of any one of Clauses 2 or 14-16, wherein determining a cache line to be eligible comprises: when existing data already stored in the cache line is associated with the scan data access pattern, comparing a recent access count of the existing data to a recent access count of the given data unit; and when the existing data already stored in the cache line is associated with the random data access pattern, comparing a recent access count of the existing data to a weighted recent access count of the given data unit.

18. The method of Clause 17, wherein the weighted recent access count is a function of a weight that is calculated based on a calculated cost of replacing data associated with the random data access pattern and a calculated benefit of storing data associated with the scan data access pattern.

19. The method of Clause 18, wherein the calculated cost and the calculated benefit are based on a cache line size or a size of data units associated with the random data access pattern relative to a size of data units associated with the scan data access pattern.

20. The method of any one of Clauses 1-19, wherein applying the one or more caching policies to or selecting when to cache a given data unit associated with the scan data access pattern further includes determining to cache the given data unit only if a recent access count of the given data unit is higher than a predetermined threshold.

21. The method of any one of Clauses 1-20, wherein applying the one or more caching policies to or selecting when to cache a given data unit associated with the scan data access pattern further includes determining to cache the given data unit only if doing so will not result in the cache being comprised of more than a threshold percentage of data associated with the scan data access pattern.

22. The method of any one of Clauses 1, 2 or 4-21, wherein the data access patterns are patterns in accordance to which the database server is or appears to be accessing the certain data units.

23. The method of any one of Clauses 1-22, further comprising associating a given data unit of the certain data units with a particular pattern of the data access patterns based on one or more of: an access pattern indicator in metadata associated with the request in which the given data unit is involved, a characteristic of the request, or a characteristic of the given data unit.

24. The method of any one of Clauses 1-23, further comprising selecting where to store a given data unit in the cache based at least in part on which of the data access patterns is associated with the given data unit.

25. The method of any one of Clauses 1-24, further comprising: whenever a given data unit of the certain data units is associated with the scan data access pattern, selecting in which one or more of the cache lines of the cache to store the given data unit based at least on which of the data access patterns are associated with existing data in the cache lines and on recent access counts for the existing data; whenever a given data unit of the certain data units is associated with the random data access pattern, storing the given data unit in a cache line without regard to which of the data access patterns is associated with existing data in the cache line.

26. The method of any one of Clauses 2-25, further comprising: adjusting the recent access counts to emphasize data units associated with the random access pattern more heavily than data units associated with the scan access pattern.

27. A storage system comprising: one or more processors; one or more interfaces communicably coupled to one or more database servers; one or more storage devices storing data blocks; one or more cache devices caching the data blocks; wherein the storage system is configured to respond certain I/O requests received over the one or more interfaces by at least retrieving the data blocks from the storage devices; wherein the storage system is further configured to cache at least a portion of the accessed data blocks in the one or more cache devices in accordance with any one of the methods recited in Clauses 1-26.

28. A caching system comprising: one or more processors; one or more interfaces communicably coupled to one or more database servers and one or more storage systems; one or more cache devices caching data blocks stored in the one or more storage systems and accessed by the one or more database servers; wherein the one or more processors are further configured to cache at least a portion of the accessed data blocks in the one or more cache devices in accordance with any one of the methods recited in Clauses 1-26.

29. One or more non-transitory computer-readable media storing instructions that, when executed by the one or more computing devices, cause performance of any one of the methods recited in Clauses 1-26.

30. A computer system comprising: one or more processors; one or more interfaces communicably coupled to one or more database servers and one or more storage systems; one or more storage media configured to store a cache comprising cache lines in which are cached data units, from the one or more storage systems, that were accessed by the database server; one or more storage media configured to store cache metadata, the cache metadata including at least recent access counts reflecting how frequently the data units have been accessed over a recent period of time; wherein the one or more processors are configured to: associate data units with data access patterns in accordance with which the database server is or appears to be accessing the data units; and select whether to cache data units accessed by the database server, based at least on the associated data access patterns and the recent access counts.

31. The computer system of Clause 30, wherein the one or more processors are further configured to select where to store cacheable data units based at least on the associated data access patterns and the recent access counts.

6.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
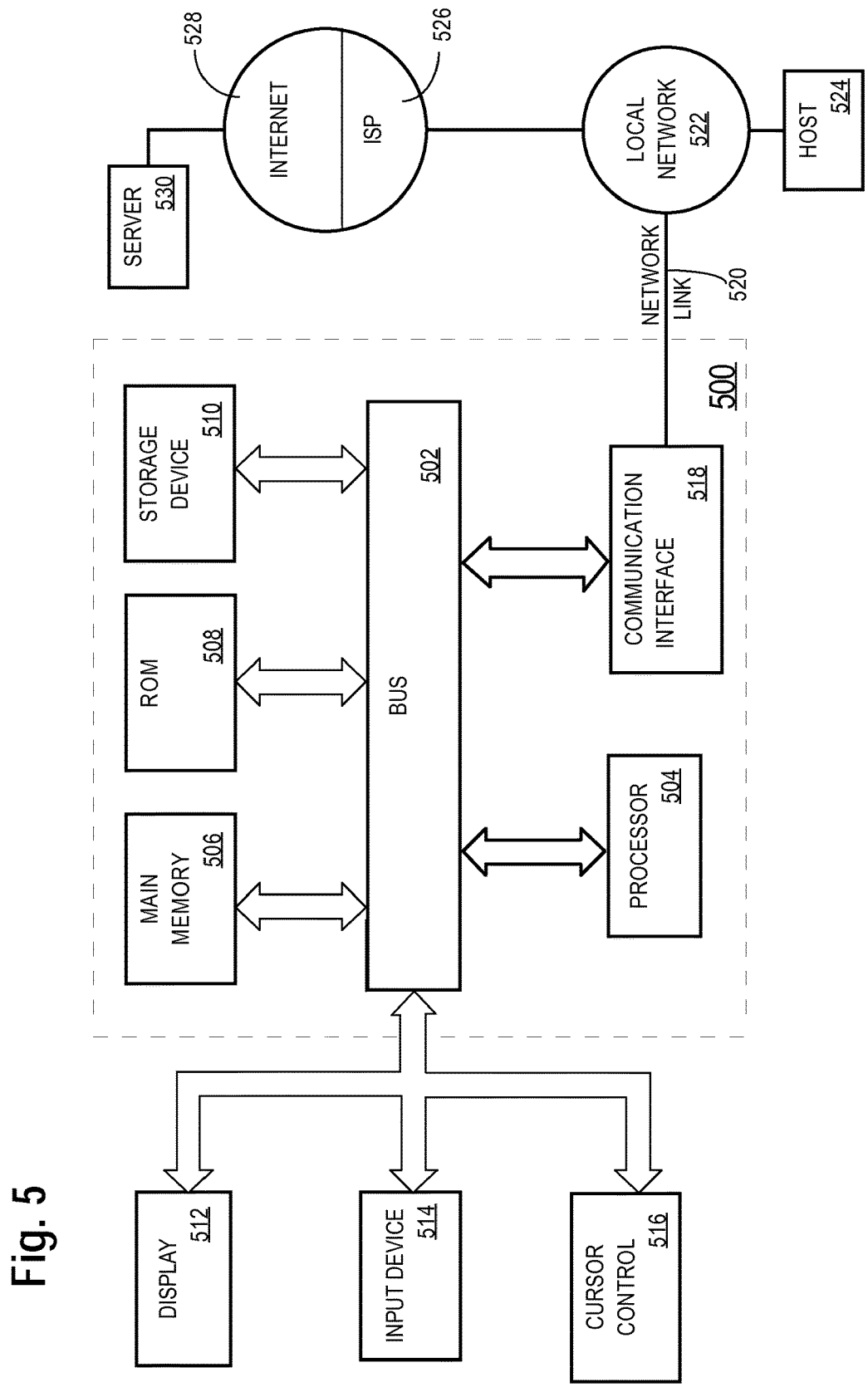
FIG. 5 is block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a light emitting diode (LED) display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
responsive to requests from a database server to access data units stored in one or more storage systems, determining, by a caching system comprising a cache, that at least certain data units accessed by the requests are not found in the cache;
determining whether particular data units of the certain data units are associated with a scan data access pattern, wherein the scan data access pattern is indicative that the requests from the database server are for a scan operation that involves accessing substantially more data units than is typical of an Online Transaction Processing (OLTP) operation;
in response to determining that the particular data units of the certain data units are associated with the scan data access pattern:
applying one or more first caching policies to the particular data units to determine whether or not to cache the particular data units;
in response to determining, based on the one or more first caching polices, to cache the particular data units, storing at least one of the particular data units in the cache responsive to the requests; and
in response to determining, based on the one or more first caching policies, to not cache the particular data units, not storing at least one of the particular data units in the cache responsive to the requests;
in response to determining that the particular data units of the certain data units are not associated with the scan data access pattern:
applying one or more second caching policies to the particular data units to determine whether or not to cache the particular data units, wherein the one or more second caching policies are different from the one or more first caching policies; and
in response to determining, based on the one or more second caching policies, to cache the particular data units, storing at least one of the particular data units in the cache responsive to the requests;
wherein the method is performed by one or more computing devices.

2. The method of claim 1, further comprising: tracking recent access counts for the data units stored in the one or more storage systems, the recent access counts being based in part on how frequently the data units have been accessed over a recent period of time, the one or more first caching policies being based at least partially on the recent access counts.

3. The method of claim 1, further comprising:
tracking recent access counts for the data units stored in the one or more storage systems, the recent access counts being based in part on how frequently the data units have been accessed over a recent period of time, the one or more first caching policies being based at least partially on the recent access counts; and adjusting the recent access counts to emphasize data units associated with a random access pattern more heavily than data units associated with the scan data access pattern.

4. The method of claim 1, further comprising:
tracking recent access counts for the data units stored in the one or more storage systems, the recent access counts being based in part on how frequently the data units have been accessed over a recent period of time.

5. The method of claim 1, further comprising:
tracking recent access counts for the data units stored in the one or more storage systems, the recent access counts being based in part on how frequently the data units have been accessed over a recent period of time;
wherein applying the one or more first caching policies comprises determining whether to cache a given data unit associated with the scan access data pattern by comparing the recent access count of the given data unit to one or more recent access counts for a set of cached data units already stored in the cache, and comparing a last access time of the given data unit to one or more last access times for the set of cached data units already stored in the cache.

6. The method of claim 5, further comprising adjusting the recent access counts to emphasize more recent accesses of the data units more heavily than less recent accesses.

7. The method of claim 1, wherein the scan data access pattern pertains to data accessed for data warehousing operations, and a random data access pattern pertains to data accessed for OLTP operations.

8. The method of claim 1, further comprising applying the one or more second caching polices to always cache any data unit associated with a random data access pattern.

9. The method of claim 1, wherein applying the one or more first caching policies comprises determining in which cache lines, of a plurality of cache lines within the cache, to store a given data unit, based at least in part on which particular data access pattern is associated with the given data unit.

10. The method of claim 1,
wherein applying the one or more first caching policies to a given data unit associated with the scan data access pattern includes determining to cache the given data unit if a number of cache lines in the cache are determined to be eligible to store the given data unit, the number being of sufficient size to store the given data unit;
wherein determining a cache line to be eligible comprises:
when existing data already stored in the cache line is associated with the scan data access pattern, comparing a recent access count of the existing data to a recent access count of the given data unit; and
when the existing data already stored in the cache line is associated with a random data access pattern, comparing a recent access count of the existing data to a weighted recent access count of the given data unit.

11. The method of claim 1, wherein applying the one or more first caching policies to a given data unit associated with the scan data access pattern further includes determining to cache the given data unit only if doing so will not result in the cache being comprised of more than a threshold percentage of data associated with the scan data access pattern.

12. The method of claim 1, further comprising associating a given data unit of the certain data units with a given data access pattern based on one or more of: an access pattern indicator in metadata associated with a most recent request in which the given data unit is involved, a characteristic of the most recent request, or a characteristic of the given data unit.

13. One or more non-transitory computer-readable media storing instructions that, when executed by the one or more computing devices, cause performance of:
responsive to requests from a database server to access data units stored in one or more storage systems, determining, by a caching system comprising a cache, that at least certain data units accessed by the requests are not found in the cache;
determining whether particular data units of the certain data units are associated with a scan data access pattern, wherein the scan data access pattern is indicative that the requests from the database server are for a scan operation that involves accessing substantially more data units than is typical of an Online Transaction Processing (OLTP) operation;
in response to determining that the particular data units of the certain data units are associated with the scan data access pattern:
applying one or more first caching policies to the particular data units to determine whether or not to cache the particular data units; and
in response to determining, based on the one or more first caching policies, to cache the particular data units, storing at least one of the particular data units in the cache responsive to the requests; and
in response to determining, based on the one or more first caching policies, to not cache the particular data units, not storing at least one of the particular data units in the cache responsive to the requests;
in response to determining that the particular data units of the certain data units are not associated with the scan data access pattern:
applying one or more second caching policies to the particular data units to determine whether or not to cache the particular data units, wherein the one or more second caching policies are different from the one or more first caching policies; and
in response to determining, based on the one or more second caching policies, to cache the particular data units, storing at least one of the particular data units in the cache responsive to the requests.

14. The one or more non-transitory computer-readable media of claim 13, wherein the instructions, when executed by the one or more computing devices, further cause performance of: tracking recent access counts for the data units stored in the one or more storage systems, the recent access counts being based in part on how frequently the data units have been accessed over a recent period of time, the one or more first caching policies being based at least partially on the recent access counts.

15. The one or more non-transitory computer-readable media of claim 13, wherein the instructions, when executed by the one or more computing devices, further cause performance of:
tracking recent access counts for the data units stored in the one or more storage systems, the recent access counts being based in part on how frequently the data units have been accessed over a recent period of time, the one or more first caching policies being based at least partially on the recent access counts; and adjusting the recent access counts to emphasize data units associated with a random access pattern more heavily than data units associated with the scan data access pattern.

16. The one or more non-transitory computer-readable media of claim 13, wherein the instructions, when executed by the one or more computing devices, further cause performance of:
tracking recent access counts for the data units stored in the one or more storage systems, the recent access counts being based in part on how frequently the data units have been accessed over a recent period of time.

17. The one or more non-transitory computer-readable media of claim 13, wherein the instructions, when executed by the one or more computing devices, further cause performance of:
tracking recent access counts for the data units stored in the one or more storage systems, the recent access counts being based in part on how frequently the data units have been accessed over a recent period of time;
wherein applying the one or more first caching policies comprises:
determining whether to cache a given data unit associated with the scan access data pattern by comparing the recent access count of the given data unit to one or more recent access counts for a set of cached data units already stored in the cache, and comparing a last access time of the given data unit to one or more last access times for the set of cached data units already stored in the cache.

18. The one or more non-transitory computer-readable media of claim 17, wherein the instructions further cause adjusting the recent access counts to emphasize more recent accesses of the data units more heavily than less recent accesses.

19. The one or more non-transitory computer-readable media of claim 13, wherein the scan data access pattern pertains to data accessed for data warehousing operations, and a random data access pattern pertains to data accessed for OLTP operations.

20. The one or more non-transitory computer-readable media of claim 13, wherein the one or more second caching policies includes a third policy to always cache any data unit associated with a random data access pattern.

21. The one or more non-transitory computer-readable media of claim 13, wherein applying the one or more first caching policies comprises determining in which cache lines, of a plurality of cache lines within the cache, to store a given data unit, based at least in part on which particular data access pattern is associated with the given data unit.

22. The one or more non-transitory computer-readable media of claim 13,
wherein applying the one or more first caching policies to a given data unit associated with the scan data access pattern includes determining to cache the given data unit if a number of cache lines in the cache are determined to be eligible to store the given data unit, the number being of sufficient size to store the given data unit;
wherein determining a cache line to be eligible comprises:
when existing data already stored in the cache line is associated with the scan data access pattern, comparing a recent access count of the existing data to a recent access count of the given data unit; and
when the existing data already stored in the cache line is associated with a random data access pattern, comparing a recent access count of the existing data to a weighted recent access count of the given data unit.

23. The one or more non-transitory computer-readable media of claim 13, wherein applying the one or more first caching policies to a given data unit associated with the scan data access pattern further includes determining to cache the given data unit only if doing so will not result in the cache being comprised of more than a threshold percentage of data associated with the scan data access pattern.

24. The one or more non-transitory computer-readable media of claim 13, wherein the instructions, when executed by the one or more computing devices, further cause performance of: associating a given data unit of the certain data units with a given data access pattern of the data access patterns based on one or more of: an access pattern indicator in metadata associated with a most recent request in which the given data unit is involved, a characteristic of the most recent request, or a characteristic of the given data unit.

25. A computer system comprising:
one or more processors;
one or more interfaces communicably coupled to one or more database servers and one or more storage systems;
one or more storage media configured to store a cache comprising cache lines in which are cached data units, from the one or more storage systems, that were accessed by the database server;
one or more storage media configured to store cache metadata, the cache metadata including at least recent access counts reflecting how frequently the data units have been accessed over a recent period of time;
wherein the one or more processors are configured to:
responsive to requests from the one or more database servers to access data units stored in the one or more storage systems, determine, by a caching system comprising the cache, that at least certain data units accessed by the requests are not found in the cache;
determine whether particular data units of the certain data units are associated with a scan data access pattern, wherein the scan data access pattern is indicative that the requests from the database server are for a scan operation that involves accessing substantially more data units than is typical of an Online Transaction Processing (OLTP) operation;
in response to determining that the particular data units of the certain data units are associated with the scan data access pattern:
apply one or more first caching policies to the particular data units to determine whether or not to cache the particular data units;
in response to determining, based on the one or more first caching policies, to cache the particular data units, store at least one of the particular data units in the cache; and
in response to determining, based on the one or more first caching policies, to not cache the particular data units, not store at least one of the particular data units in the cache responsive to the requests;
in response to determining that the particular data units of the certain data units are not associated with the scan data access pattern:
apply one or more second caching policies to the particular data units to determine whether or not to cache the particular data units, wherein the one or more second caching policies are different from the one or more first caching policies; and in response to determining, based on the one or more second caching policies, to cache the particular data units, store at least one of the particular data units in the cache responsive to the requests.

26. The computer system of claim 25, wherein the one or more processors are further configured to select where to store cacheable data units based at least on the associated data access patterns and the recent access counts.

\* \* \* \* \*

UNITED STATES PATENT AND TRADEMARK OFFICE
CERTIFICATE OF CORRECTION

PATENT NO. : 10,229,161 B2  
APPLICATION NO. : 14/489221  
DATED : March 12, 2019  
INVENTOR(S) : Kakarla et al.

Page 1 of 1

It is certified that error appears in the above-identified patent and that said Letters Patent is hereby corrected as shown below:

In the Specification

In Column 15, Line 6, delete "Recovey" and insert -- Recovery --, therefor.

In Column 24, Line 9, delete "to to" and insert -- to --, therefor.

In Column 27, Line 14, after "prevented" insert -- . --.

In Column 34, Line 3, after "claims" insert -- . --.

In the Claims

In Column 34, Line 33, in Claim 1, delete "polices," and insert -- policies, --, therefor.

In Column 35, Line 32, in Claim 8, delete "polices" and insert -- policies --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*